United States Patent [19]
Yamada

[11] Patent Number: 5,107,435
[45] Date of Patent: Apr. 21, 1992

[54] APPARATUS FOR CONTROLLING MACHINE TOOL HAVING SPECIAL DISPLAY, DATA ENTRY AND MOTOR CONTROL MODES

[75] Inventor: Minoru Yamada, Aichi, Japan

[73] Assignee: Brother Kogyo Kabushiki Kaisha, Aichi, Japan

[21] Appl. No.: 489,951

[22] Filed: Mar. 7, 1990

[30] Foreign Application Priority Data

Mar. 10, 1989 [JP] Japan ................................... 1-58562

[51] Int. Cl.⁵ .............................................. G06F 15/46
[52] U.S. Cl. .......................... 364/474.22; 364/474.02; 408/11
[58] Field of Search ....................... 364/474.22–474.27, 364/474.02, 191–193, 188, 189; 408/8–13, 16

[56] References Cited

U.S. PATENT DOCUMENTS

| | | | |
|---|---|---|---|
| 4,723,207 | 2/1988 | Isobe et al. | 364/474.22 X |
| 4,916,639 | 4/1990 | Yoneda et al. | 364/474.22 |
| 4,926,311 | 5/1990 | Matsumura et al. | 364/474.22 X |
| 4,943,906 | 7/1990 | Tajima et al. | 364/474.22 X |

Primary Examiner—Joseph Ruggiero
Attorney, Agent, or Firm—Oliff & Berridge

[57] ABSTRACT

An apparatus for controlling a machine tool including a tool holder spindle for performing a machining operation, a motor for rotating the spindle, an operator's control panel which has a data display with a plurality of display digits, and a plurality of operator's control switches, and a control device comprising a motor controller for controlling the spindle motor, according to control data entered through the operator's control switches. The control device includes a special-operation detector for detecting one of at least one special operation of at least one of the control switches, a mode selector for selecting one of at least one special operation mode of the control device corresponding to the detected one of the at least one special operation, and a special data setting controller for placing the data display in the selected one special operation mode and permitting the control device to enter special presetting data through the control switches.

17 Claims, 26 Drawing Sheets

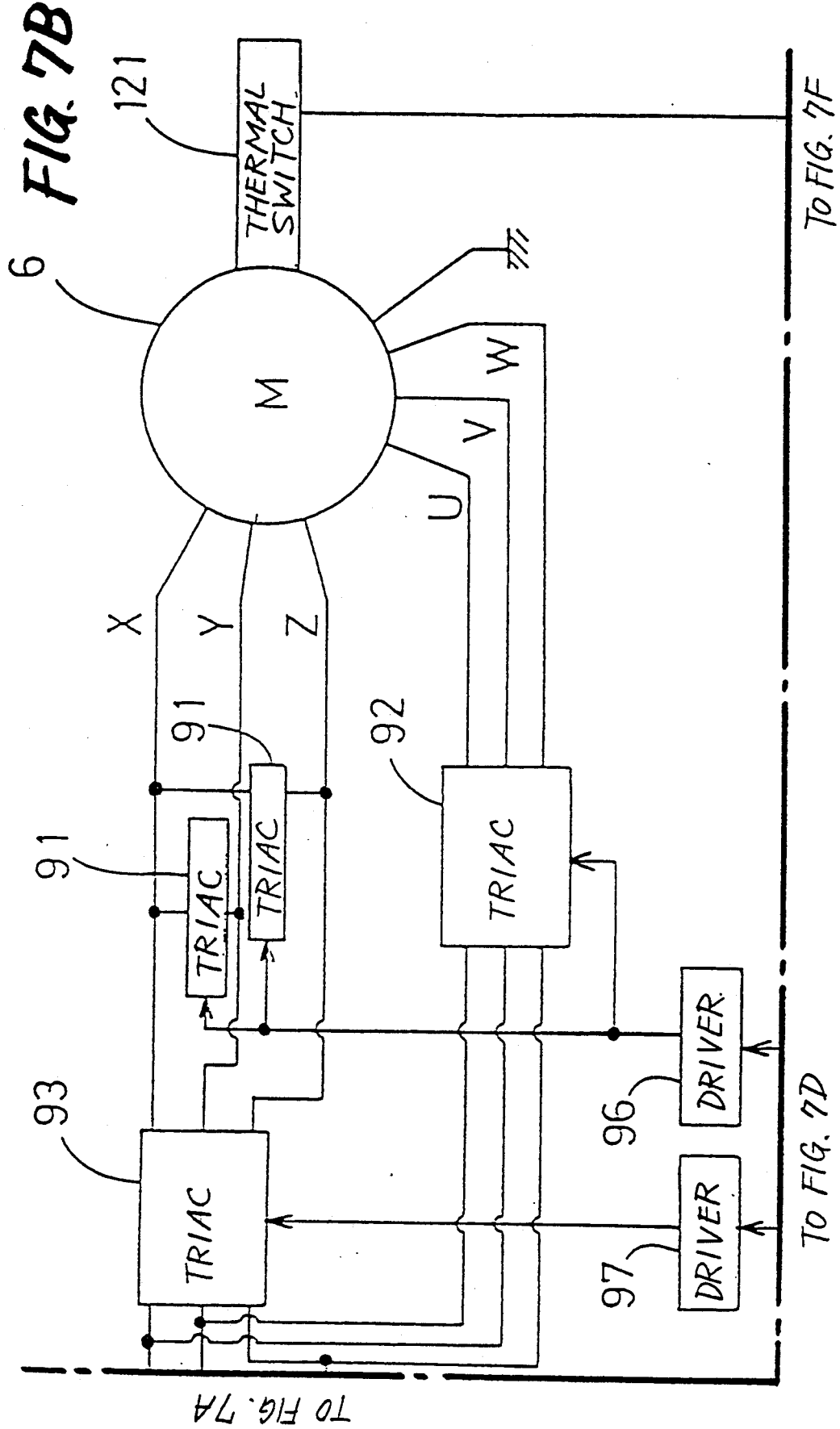

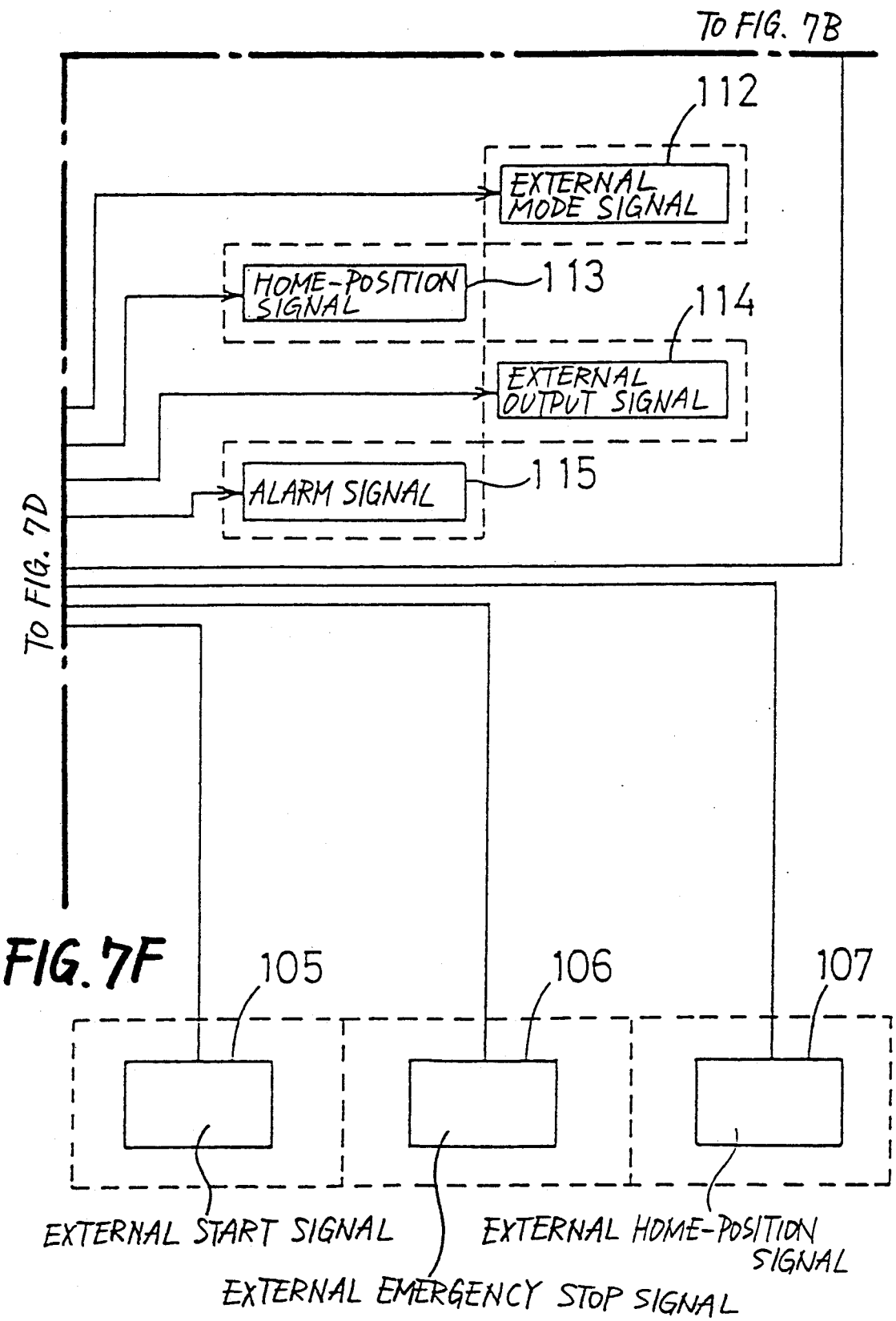

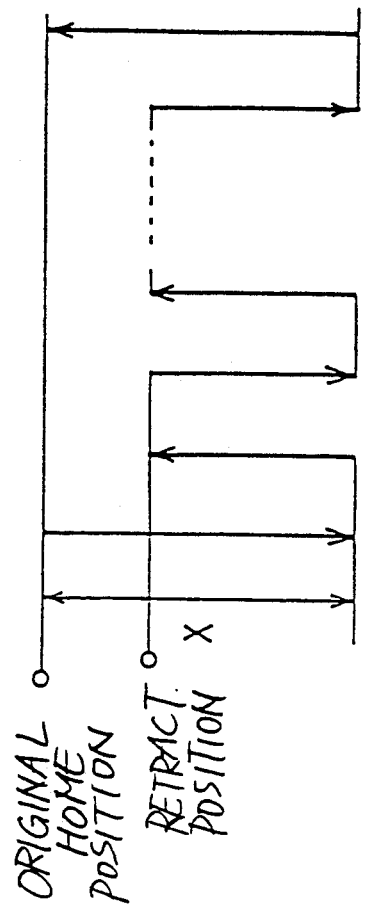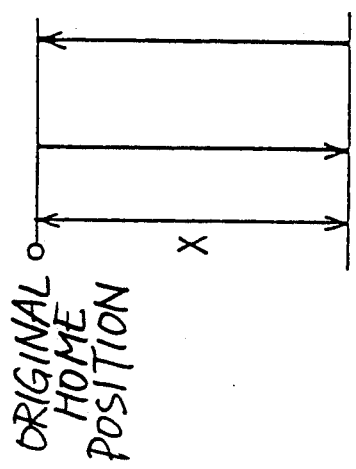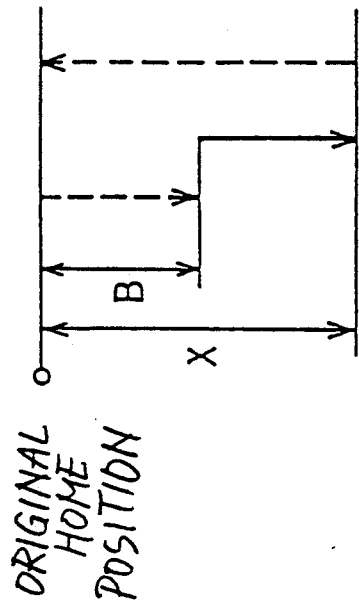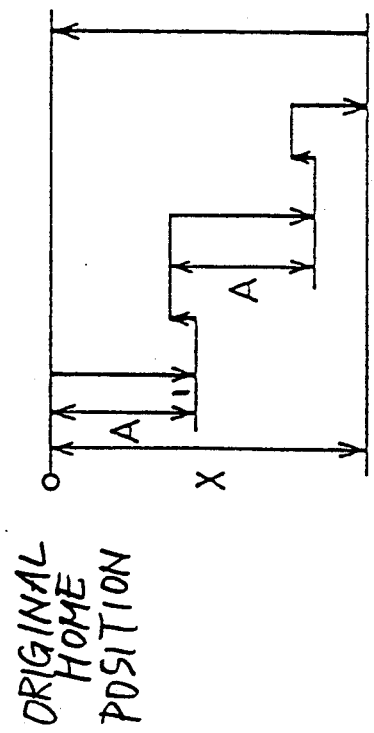

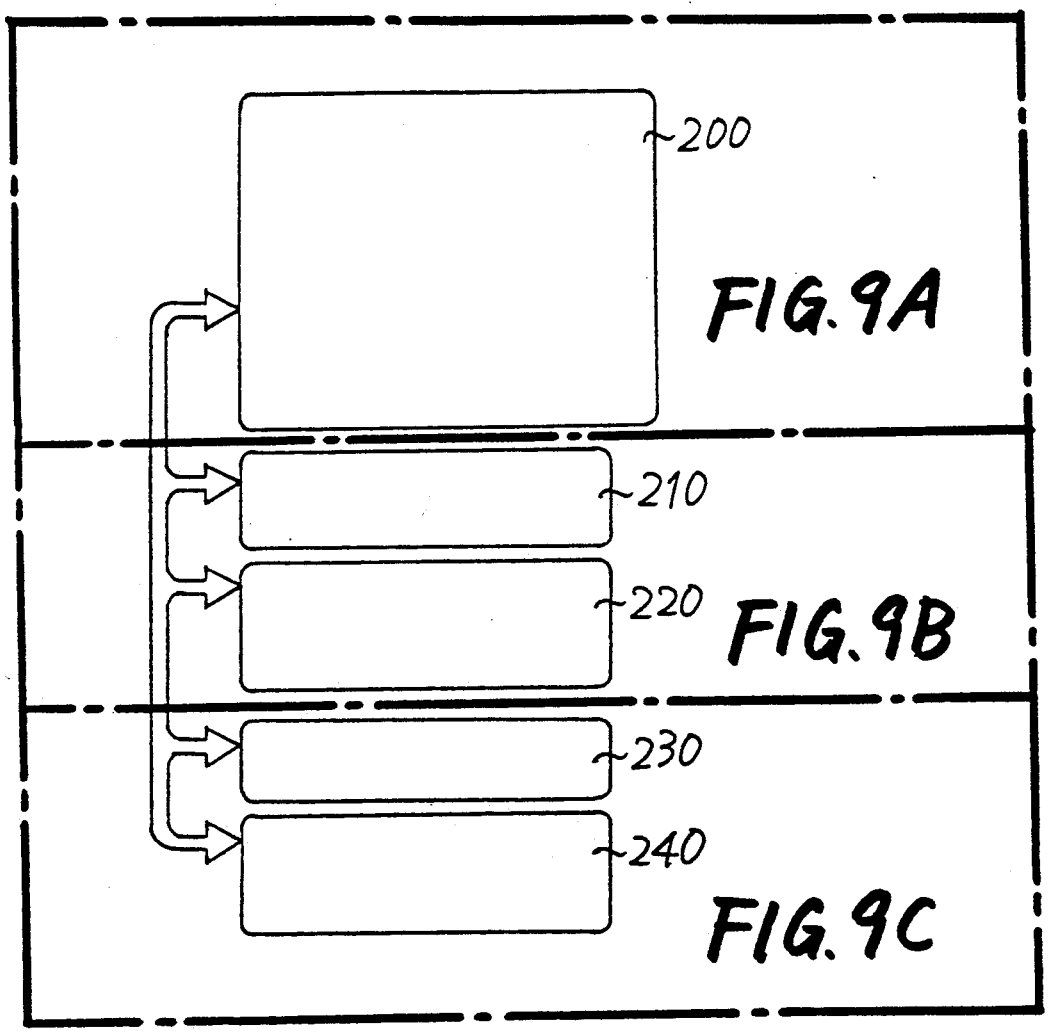

APPARATUS FOR CONTROLLING MACHINE TOOL HAVING SPECIAL DISPLAY, DATA ENTRY AND MOTOR CONTROL MODES

BACKGROUND OF THE INVENTION

1. Field of the Invention

The present invention relates in general to a control apparatus for controlling a machine tool, and more particularly to a control apparatus for a single-purpose machine tool such as a tapping machine, which is not equipped with a complicated numerical controller.

2. Discussion of the Prior Art

For controlling a tapping machine, a drilling unit or other machine tool adapted to perform a comparatively simple machining operation, there has been used a control apparatus using an electronic circuit arrangement as disclosed in laid-open Publication No. 60-44088 of examined Japanese Patent Application. To meet a recent growing need for a complicated machining operation on such a comparatively simple machine tool, the use of a microcomputer for the control apparatus is proposed.

To expand the function of the machine tool to perform the complicated machining operation, however, it is necessary to provide the control apparatus with an increased number of operator's control switches and a sophisticated or large-capacity indicator or display arrangement, resulting in an increased cost of manufacture of the control apparatus.

It is also noted that such a relatively simple machine tool is not always operated by a skilled operator who is familiar with complicated operating procedures. An erroneous manipulation of the control switches may cause an unexpected movement or operation of moving a component or components of the machine tool, which may result in damaging the machine, cutting tool or workpiece.

SUMMARY OF THE INVENTION

It is therefore an object of the present invention to provide a control apparatus for controlling a machine tool, which enables the machine tool to perform a complicated machining operation, with a comparatively reduced number of operator's control switches, and with minimum possibility of an unexpected operation caused by an erroneous manipulation of the control switches.

The above object may be attained according to the principle of the present invention, which provides an apparatus for controlling a machine tool including holding means for holding a member for performing a machining operation, driving means for driving the member, an operator's control panel which has a data display with a plurality of display digits, and a plurality of operator's control switches, and control means comprising a controller for controlling the driving means, according to control data entered through the operator's control switches, wherein the control device includes special-operation detecting means for detecting one of at least one special operation of at least one of the operator's control switches, mode selecting means responsive to the special-operation detecting means, for selecting one of at least one special operation mode of the control device corresponding to the detected one of the at least one special operation, and special data setting control means for placing the data display in the selected one special operation mode and permitting the control device to enter special presetting data through the control switches. The special presetting data are associated with the machining operation to be performed, and the control device is operable to control the driving means according to the special presetting data.

In the control apparatus of the present invention constructed as described above, the special operation mode or modes is/are selected only when the corresponding special operation or operations of the operator's control switch or switches is/are detected. In each special operation mode, the special presetting data may be entered through the appropriate operator's control switches. Thus, the number of the operator's control switches necessary to normally control the machine and enter the special presetting data in the special operation mode or modes can be significantly reduced. Yet, the control device can control the machine tool, so as to perform a relatively complicated machining operation which is specified by the special presetting data entered in the special mode or modes. Namely, the infrequently performed operation to enter the special presetting data may be effected by using the operator's control switches which are normally used to control the machine. Further, the special operation of the control switch or switches prevents the operator from erroneously establishing the special operation mode or mode of the control device.

The special operation detected by the special-operation detecting means may involve concurrent operations of a plurality of control switches of the operator's control switches, preferably, for a time duration exceeding a predetermined time length, for example, in the neighborhood of at least three seconds.

Alternatively, the special operation may involve an operation of one of the operator's control switches for at least a predetermined length of time.

Where the operator's control panel has a plurality of mode selector switches for establishing respective normal operation modes of the control device different from the special operation mode or modes, the mode selecting means changes one of the normal operation modes to the selected one special operation mode when the special-operation detecting means detects the special operation of the operator's control switch or switches. Usually, the operator's control panel further has a plurality of data setting switches for entering the special presetting data under the control of the special data setting control means. In this case, the special-operation detecting means may be adapted to detect each special operation by detecting concurrent operations of a plurality of control switches of the operator's control switches. These control switches concurrently operated may include one of the mode selector switches. In this instance, the control switches concurrently operated may include one of the mode selector switches which is assigned to establish a normal data setting mode in which normal setting data for the machining operation are entered through the data setting switches. Further, the control switches concurrently operated may also include at least one of the data setting switches. The control switches concurrently operated consist of two control switches of the operator's control switches.

The special-operation detecting means may be adapted to detect one of a plurality of special operations of the at least one of the plurality of operator's control switches. In this case, the mode selecting means is adapted to select one of a plurality of special operation modes of the control device which corresponds to the detected special operation. In this case, the plurality of special operation modes of the control device may include a special data setting mode, and a plurality of special data presetting modes for entering the special presetting data. The mode selecting means establishes the special data presetting modes while the special data setting mode is established. The mode selecting means may establish one of the special data presetting modes when the special-operation detecting means detects a special operation of the operator's control switch or switches, which special operation is different from a special operation of the operator's control switch or switches which is detected to establish the special data setting mode.

The present control apparatus is suitably used for controlling a tapping machine, for example, which has a spindle quill reciprocably supported by a machine frame, for rotatably supporting a spindle. A spindle motor is operatively connected to the spindle and spindle quill, through a power transmission mechanism, such that the spindle is reciprocated and rotated by a rotary movement of the spindle motor. The control apparatus may use an encoder for generating pulses each of which corresponds to an incremental distance of movement of the spindle, so that the operating stroke of the spindle is controlled based on the number of the pulses from the encoder.

BRIEF DESCRIPTION OF THE DRAWINGS

The above and other objects, features and advantages of the present invention will become more apparent by reading the following description of a presently preferred embodiment of the invention, when considered in connection with the accompanying drawings, in which:

FIGS. 7 and 7A through 7F are a block diagram showing one embodiment of a control apparatus of the present invention adapted to control the tapping machine of FIG. 1;

FIGS. 8(a) through 8(f) are views indicating movements of a spindle quill of the machine;

FIGS. 9, 9A through 9C and 10 are explanatory views indicating changes of operating modes of the machine.

DETAILED DESCRIPTION OF THE PREFERRED EMBODIMENT

Figure 1:
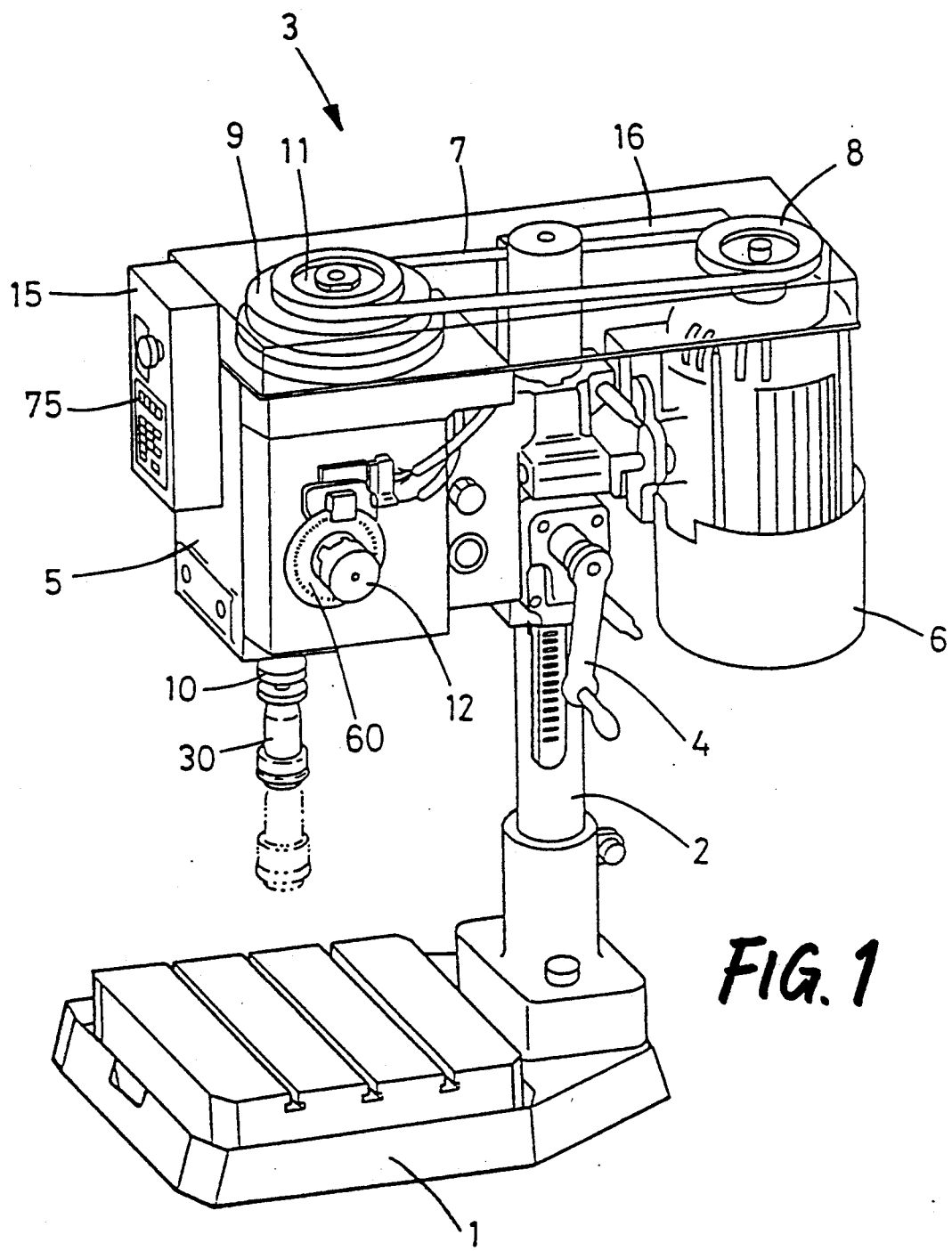
FIG. 1 is a perspective view showing a tapping machine to which the principle of the present invention is applied.

Referring first to FIGS. 1-4, the tapping machine has a column 2 which extends upright from a base 1 and supports a tapping unit generally indicated at 3 in FIG. 1. The tapping unit 3 is vertically positioned on the column 2, by operating a vertical positioning lever 4, and includes a spindle head 5 and a spindle motor 6 for driving the spindle head 5 through a V-belt 7. The spindle motor 6 is a bidirectional variable-speed 4/8-pole pole-change induction motor. The spindle head 5 has a main spindle 10, which is operatively connected to the spindle motor 6 via the V-belt 7, a drive pulley 8, a driven pulley 9 and other power transmission components which will be described. The speed of the main spindle 6 with respect to that of the spindle motor 6 is variable in three steps by changing the V-grooves of the pulleys 8, 9 which engage the V-belt 7. The main spindle 10 has a tap chuck 30 fixed to its free or lower end.

The spindle head 5 incorporates a power transmitting mechanism coupled to the driven pulley 9, which is constructed so that the main spindle 10 is fed in the forward or tapping direction while the spindle motor 6 is rotating in the forward direction, and is fed in the reverse or retracting direction while the motor 6 is rotating in the reverse direction. The feed rate of the spindle 10 or the tapping pitch is determined or changed by first and second change gears 41, 42.

The driven pulley 9 incorporates an overload protective spindle clutch 11 which slips upon application of an excessive torque to the spindle 10 during a tapping operation, to protect the tapping machine from damage due to the overload. The power transmitting mechanism of the spindle head 5 incorporates an overload protective feed clutch 12 which slips to protect the machine when an excessive thrust is applied to the spindle 10 in the axial or feeding direction. Adjacent to the feed clutch 12, there is provided a rotary encoder 60 for detecting the operating position or stroke of the main spindle 10.

The spindle head 5 has an operator's control panel 15 provided on its front side, for the operator to enter necessary tapping data, select the operating mode of the machine, and perform other operations for controlling the machine. The tapping unit 3 has a control console or board 16 provided on its left side, for controlling the spindle motor 6, according to the signals from the operator's control panel 15, rotary encoder 60 and other components. Namely, the control board 16 includes a microcomputer 100 (FIG. 7) for performing various control operations, such as turning on and off the motor 6 and changing the operating direction and the number of poles of the motor 6.

Figure 2:
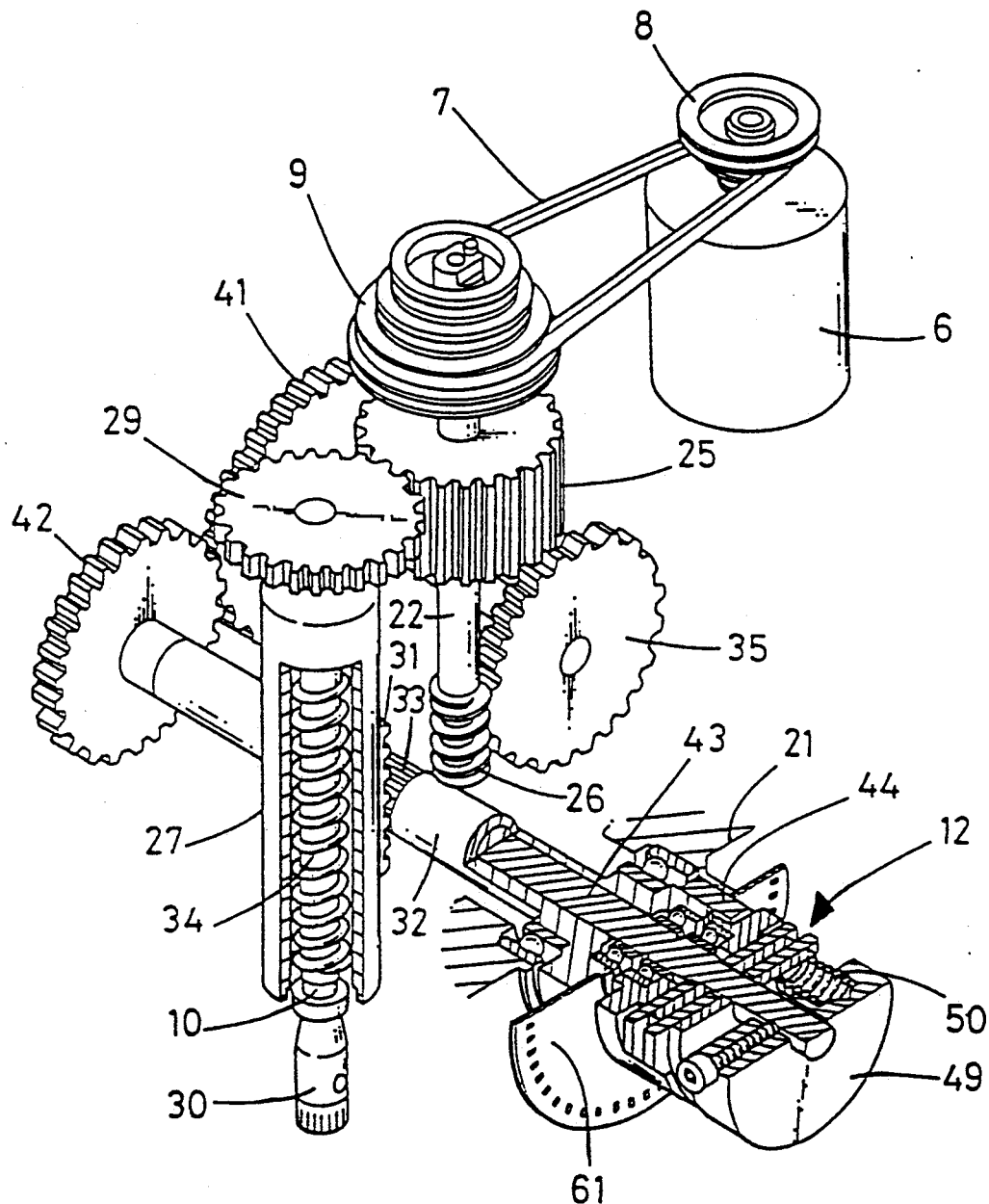
FIG. 2 is a perspective view of a power transmitting mechanism of the tapping machine of FIG. 1.
Figure 3:
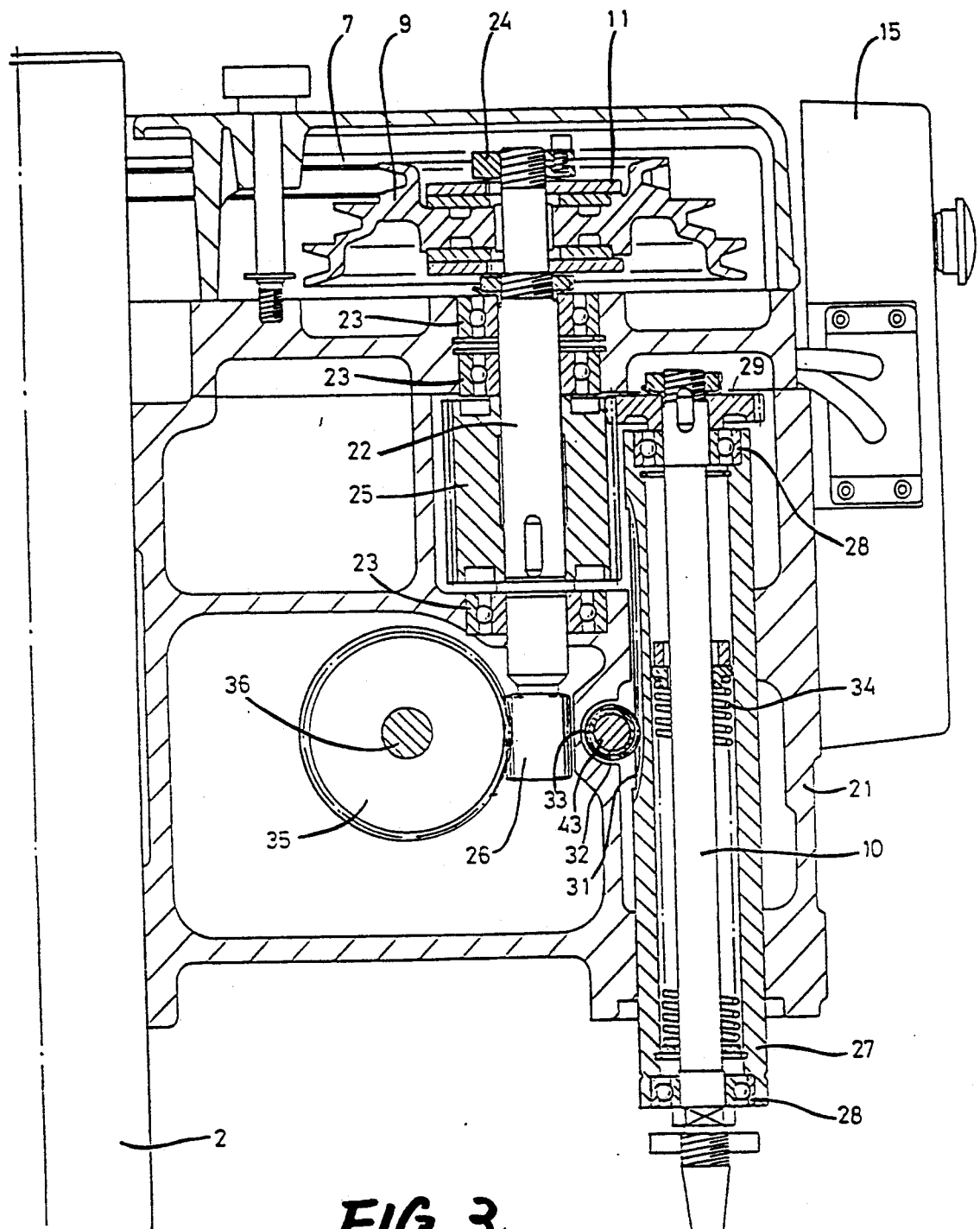
FIG. 3 is an elevational view in vertical cross section of a spindle head of the tapping machine.
Figure 4:
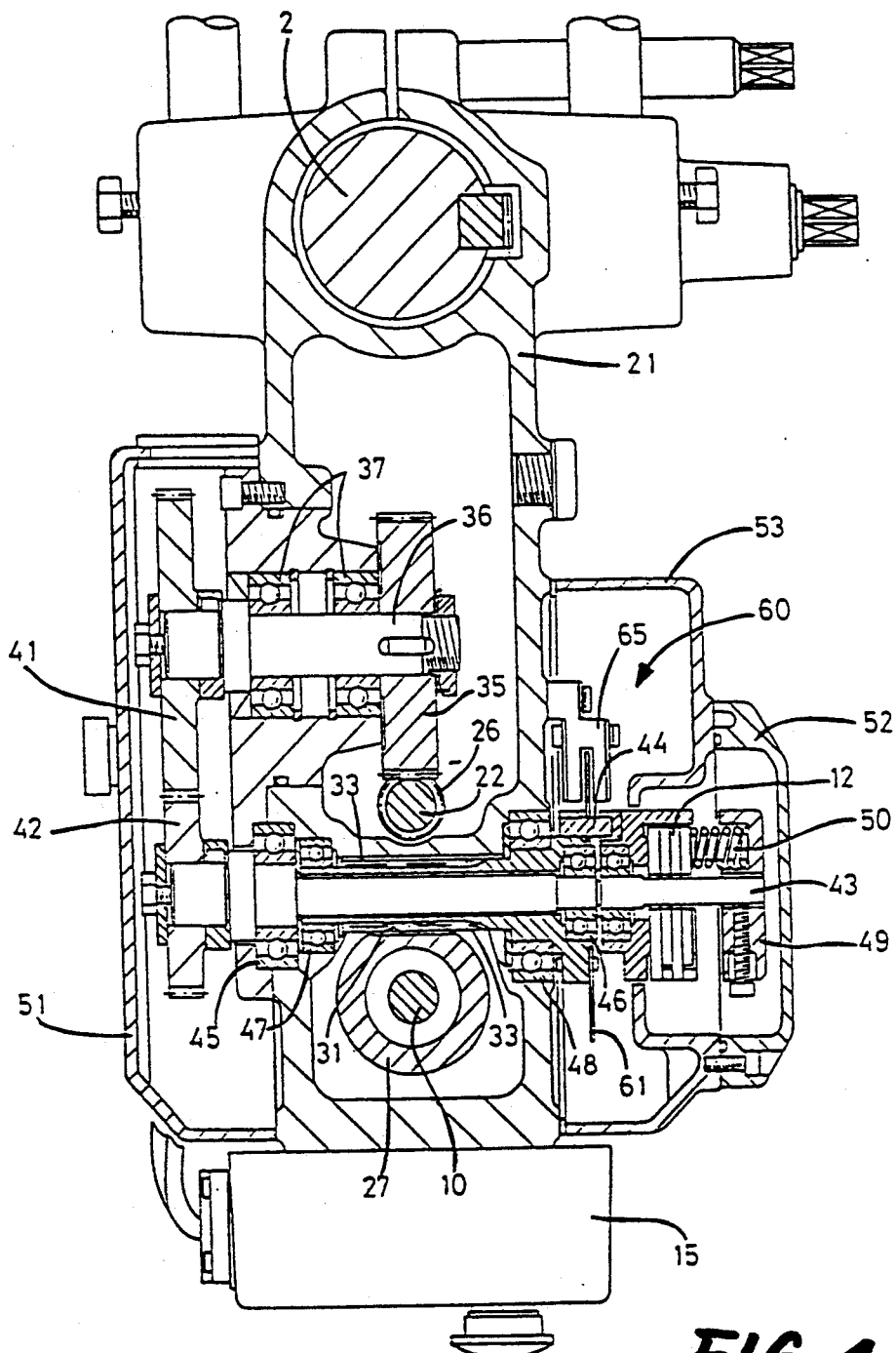
FIG. 4 is a horizontal cross sectional view of the spindle head.

The power transmission mechanism incorporated in the spindle head 5 is illustrated in perspective in FIG. 2, and in vertical and horizontal cross sections in FIGS. 3 and 4, respectively.

The spindle head has a frame 21 by which a drive shaft 22 is rotatably supported in the vertical direction through bearings 23. The driven pulley 9 is attached to the upper end of the drive shaft 22 through the spindle clutch 11. The operating torque of the spindle clutch 11 is adjustable by spindle torque adjusting nut 24. The drive shaft 22 has a main drive gear 25 fixedly mounted thereon at an axially intermediate portion thereof. The drive shaft 22 has a worm 26 formed at the lower end. The frame 21 also supports a spindle quill 27 such that the quill 27 is vertically movable. The main spindle 10 is rotatably supported within the spindle quill 27 through bearings 28. The spindle quill 27 is not rotatable, and the spindle 10 is rotatable relative to the quill 17 and is vertically reciprocable with the quill 27. The spindle 10 has a spindle drive gear 29 fixed to its upper end, and the gear 29 meshes with the main drive gear 25 so that the spindle 10 is rotated through the gears 25, 29. As indicated above, the spindle 10 is adapted to hold the tap chuck 30 at its lower end, for chucking a tap.

The spindle quill 27 has a rack 31 formed on the outer circumference, so as to extend in the longitudinal direction. The rack 31 engages a pinion 33 formed on a pinion sleeve 32 which is supported by the frame 21 so as to extend in the horizontal direction. The spindle quill 27 is biased by a spring 34 for eliminating a backlash between the rack 31 and the pinion 33.

The worm 26 at the lower end of the drive shaft 22 engages a worm wheel 35 supported by a first rotary shaft 36. This shaft 36 is rotatably supported by the frame 21 through bearings 37, so as to extend in the horizontal direction. The first change gear 41 indicated above is removably fixed to one of the opposite ends of the shaft 36 which projects from the left-hand side wall of the frame 21. The first change gear 41 meshes the second change gear 42 also indicated above, which is removably fixed to the corresponding end of a second rotary shaft 43. This shaft 43 extends through the pinion sleeve 32, such that the end to which the feed clutch 12 is attached projects from the right-hand side wall of the frame 21. A rotary motion of the second rotary shaft 42 is transmitted to the pinion sleeve 32 through the feed clutch 12. The feed clutch 12 is connected to the pinion sleeve 32 by means of a pinion pin 44. The second rotary shaft 43 is supported by the frame 21 through two bearings 45, 46, while the pinion sleeve 32 is supported by the frame 21 through bearings 47, 48. The pinion 33 indicated above is formed on the outer circumferential surface of an axially intermediate portion of the pinion sleeve 32, so that a rotary motion of the pinion sleeve 32 is converted into a linear vertical reciprocating movement of the spindle quill 27, through the mutually engaging pinion 33 and rack 31.

In the power transmission mechanism constructed as described above, the tapping pitch or the feeding distance of the quill 27 per unit angle of rotation of the quill 27 is changed by changing the first and second change gears 41, 42. The operating torque of the feed clutch 12 is adjustable by changing the biasing force of a biasing spring 50, by operating a feed torque adjusting nut 49. The change gears 41, 42 are covered by a cover 51, while the feed clutch 12 is covered by covers 52, 53.

Figure 5:
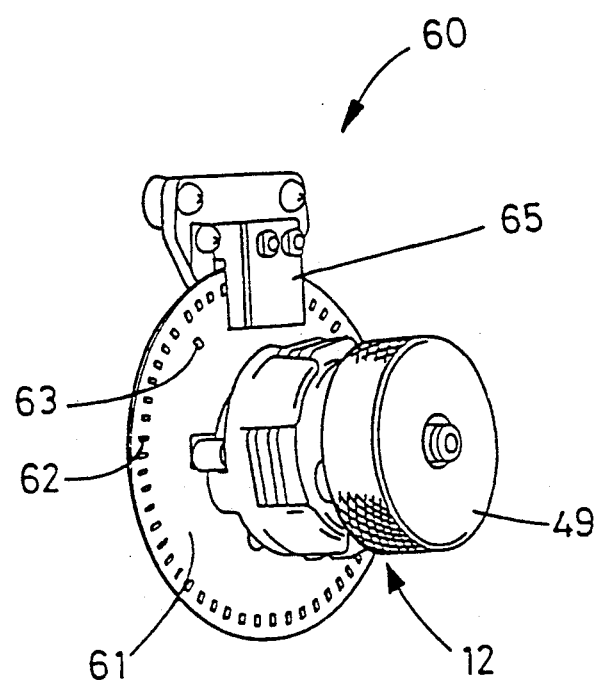
FIG. 5 is a perspective view of a rotary encoder provided on the tapping machine.
Figure 7:
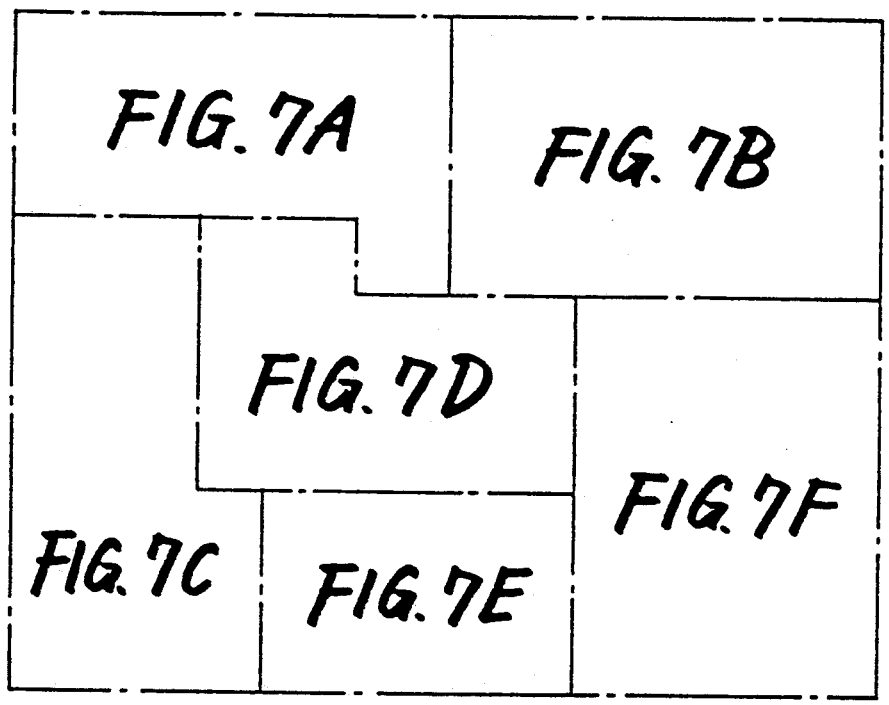
Figure 7A:
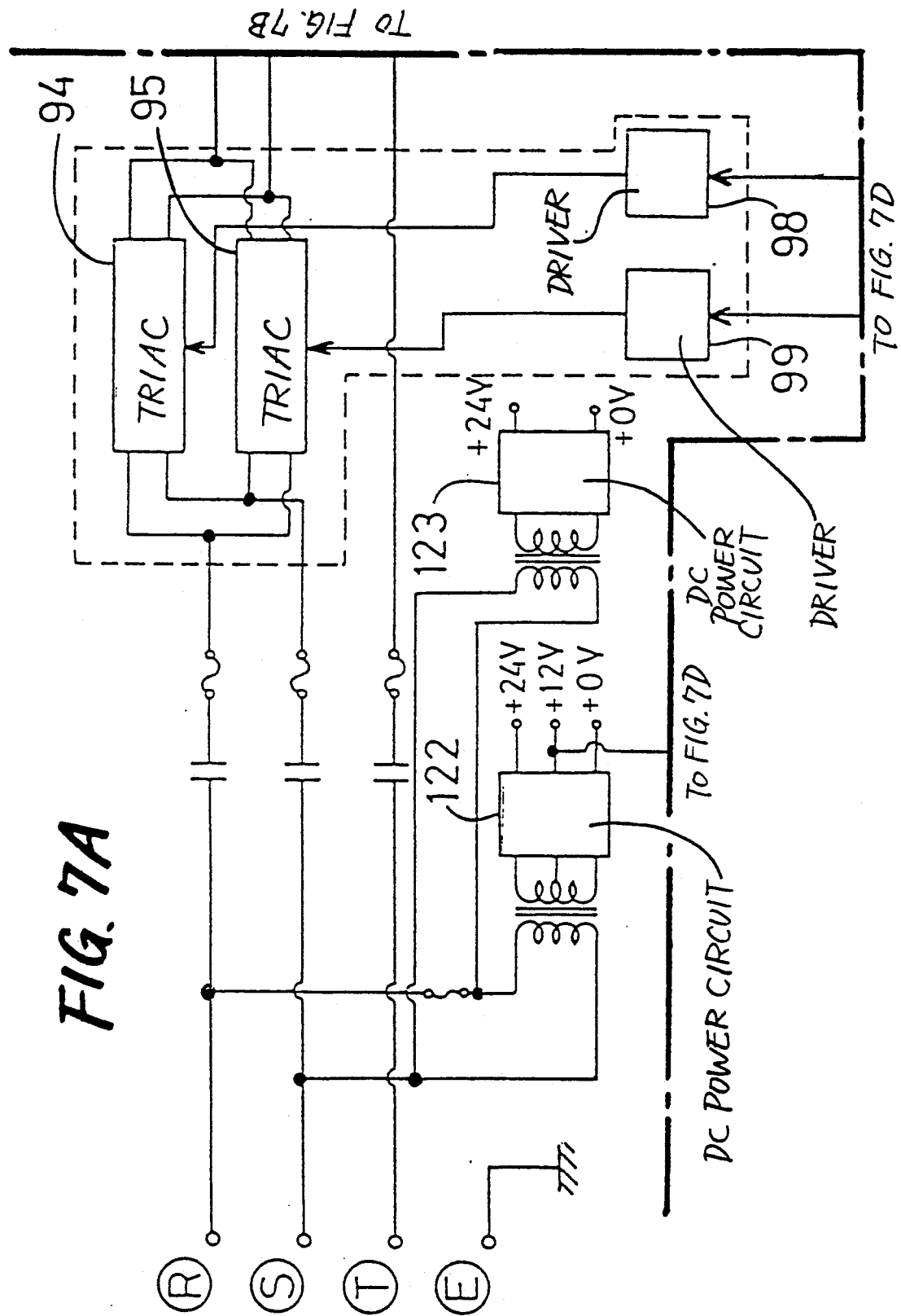
Figure 7C:
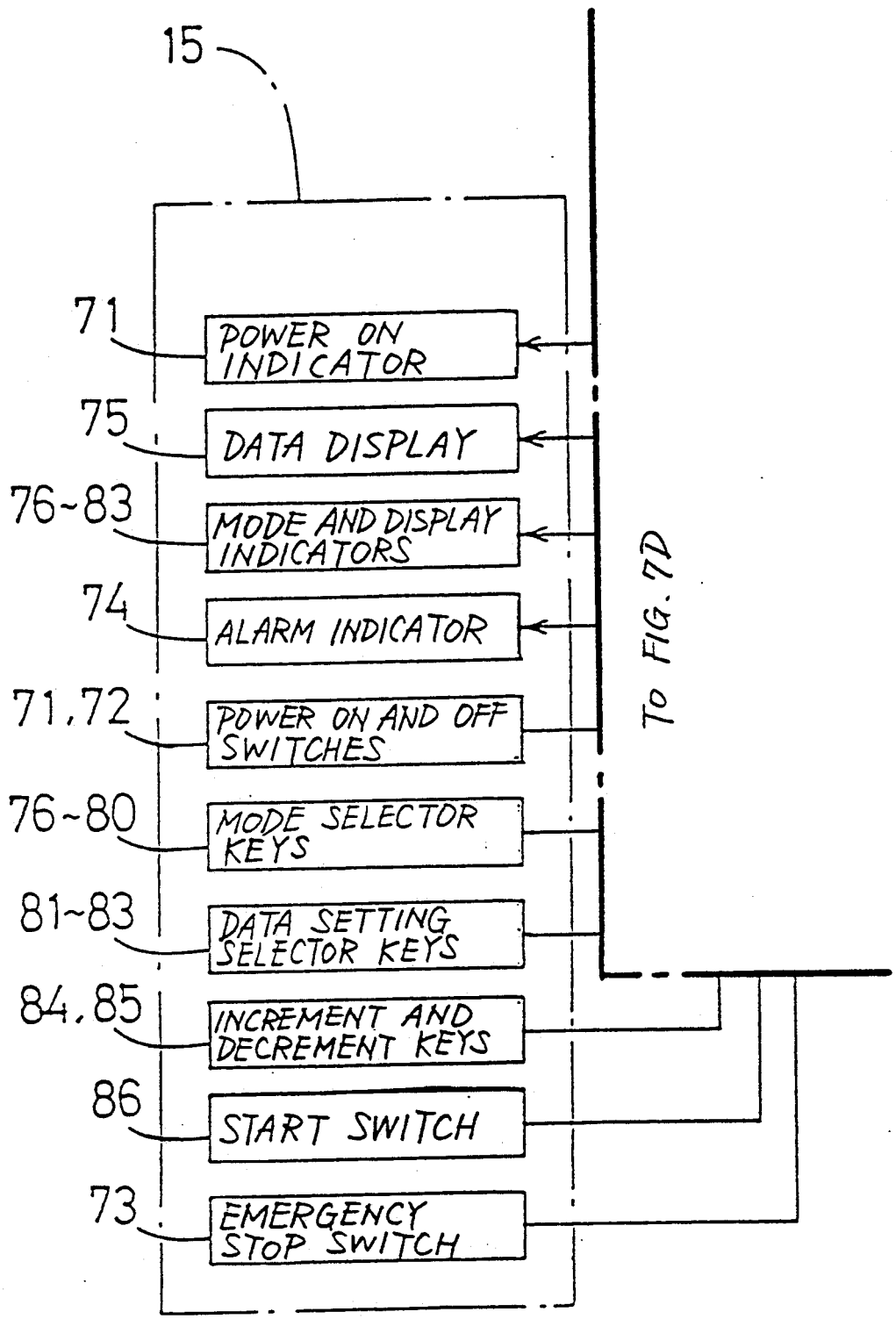
Figure 7D:
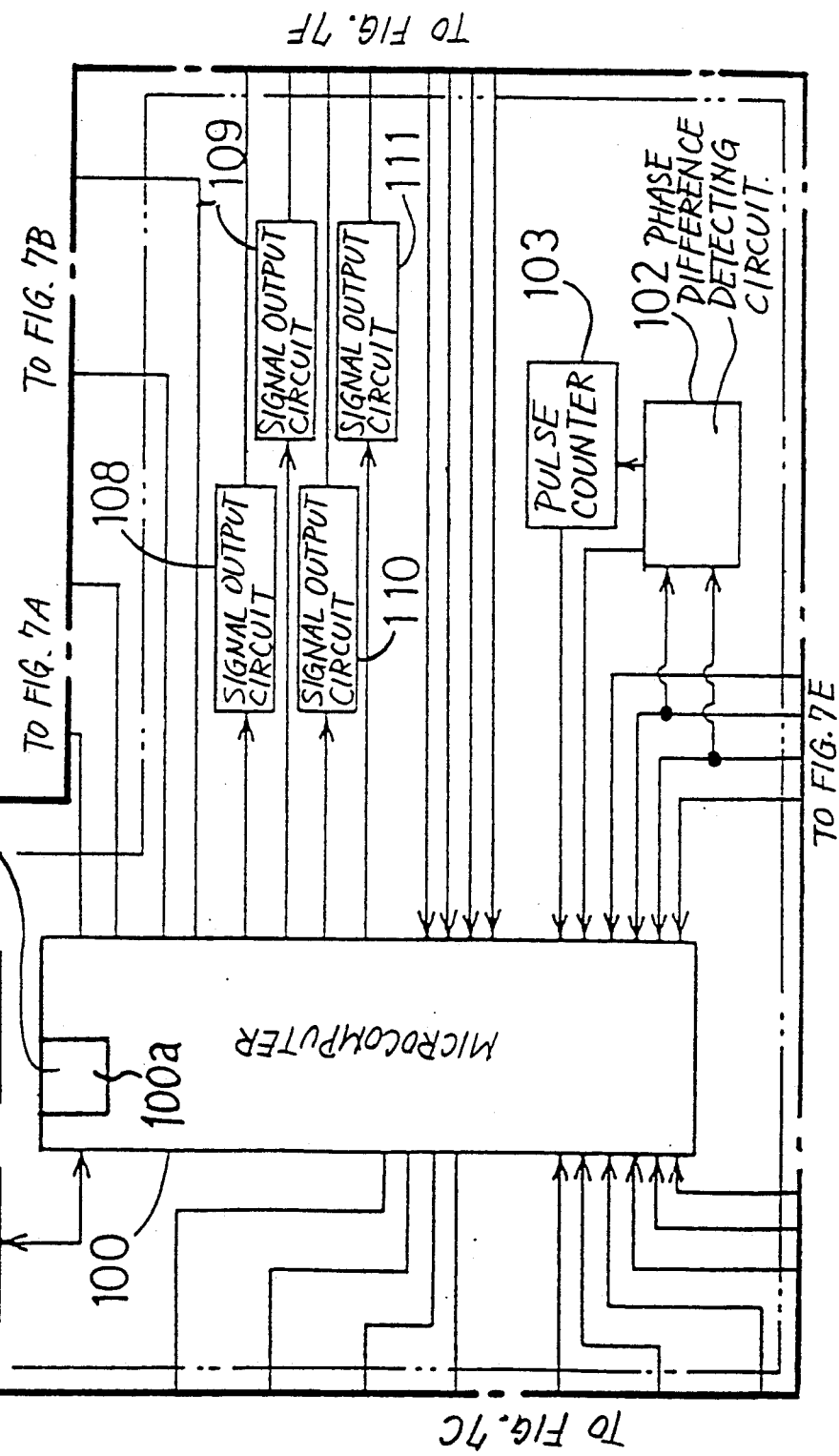
Figure 7E:
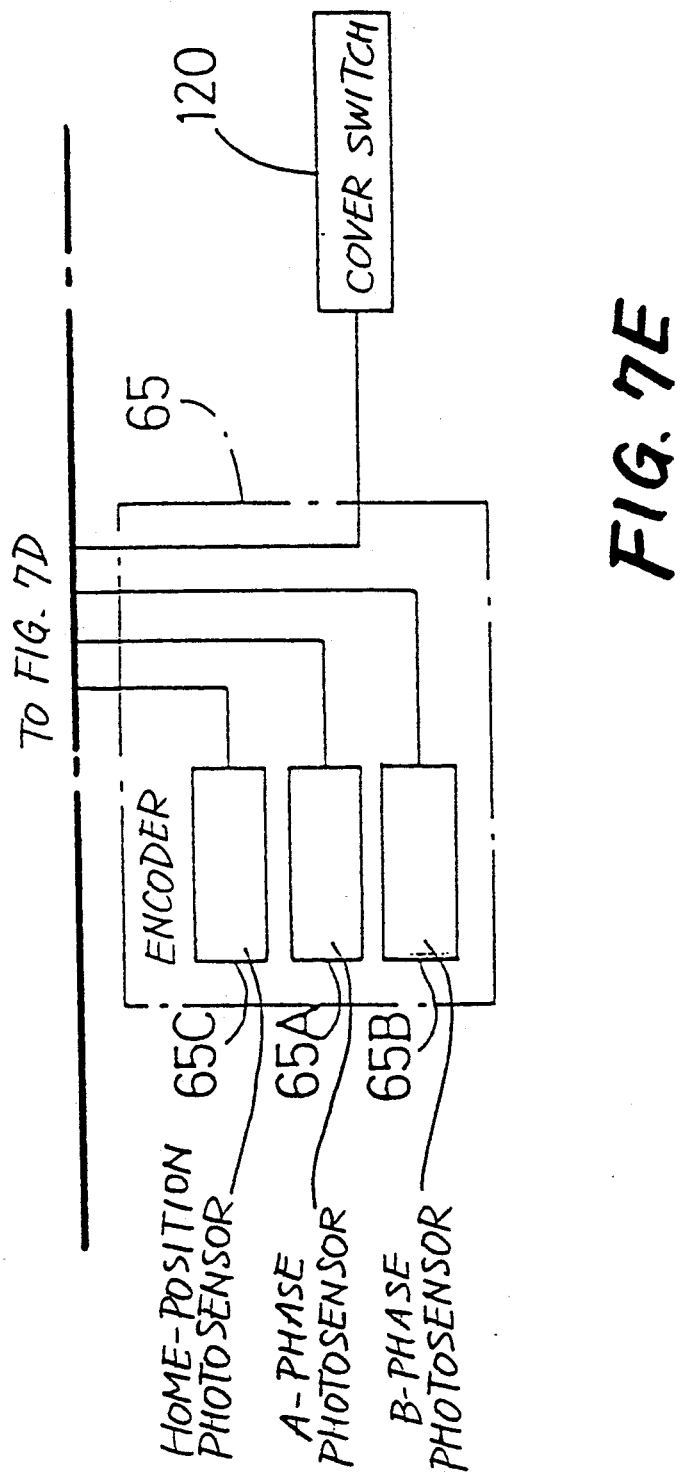

The rotary encoder 60 will be described in detail. The encoder 60 includes an encoder disk 61 which is fixed to the end of the pinion sleeve 32 adjacent to the feed clutch 12 on the second rotary shaft 43, as shown in FIG. 2. The encoder disk 61 is rotated with the pinion sleeve 32, which rotates to reciprocate the spindle quill 27. Accordingly, the rotation of the encoder disk 61 represents the position or operating stroke of the quill 27. As shown in FIG. 5, the encoder disk 61 has a multiplicity of apertures 62, which are equally spaced from each other in the circumferential direction of the disk 61. The rotary encoder 60 further includes a photoelectric detector 65 fixed to the frame 21. The detector 65 has three light emitting elements in the form of diodes disposed on one side of the disk 61, and corresponding three photosensors in the form of phototransistors disposed on the other side of the disk 61. The photoelectric detector 65 is adapted to detect the passage of the apertures 62 during rotation of the disk 61. The angular spacing of the apertures 62 is determined so as to correspond to a feeding distance of 0.5 mm of the spindle 10. The encoder disk 61 further has a home-position aperture 63, formed therethrough at a position radially inwardly of the circular array of apertures 62. This home-position aperture 63 is provided to detect the uppermost end or home or original position of the spindle 10. The above-indicated three phototransistors of the photoelectric detector 65 serve as an A-phase sensor 65A, a B-phase sensor 65B and a home-position sensor 65C, as indicated in FIG. 7. The A-phase and B-phase sensors 65A, 65B, which generate A-phase and B-phase signals (as indicated in FIG. 8), respectively, are spaced apart from each other in the circumferential direction of the encoder disk 61, by a circumferential space corresponding to a quarter of the angular spacing of the apertures 62. The A-phase and B-phase signals permit the detection of not only the rotating angle but also the rotating direction of the disk 61, namely, the distance and direction of vertical movement of the spindle quill 27. The home-position sensor 65C is adapted to detect the passage of the home-position aperture 63 for detecting the home position of the spindle quill 27 (spindle 10), as indicated above. Thus, the encoder disk 61 and the photoelectric detector 65 cooperate to constitute the rotary encoder 60.

Figure 6:
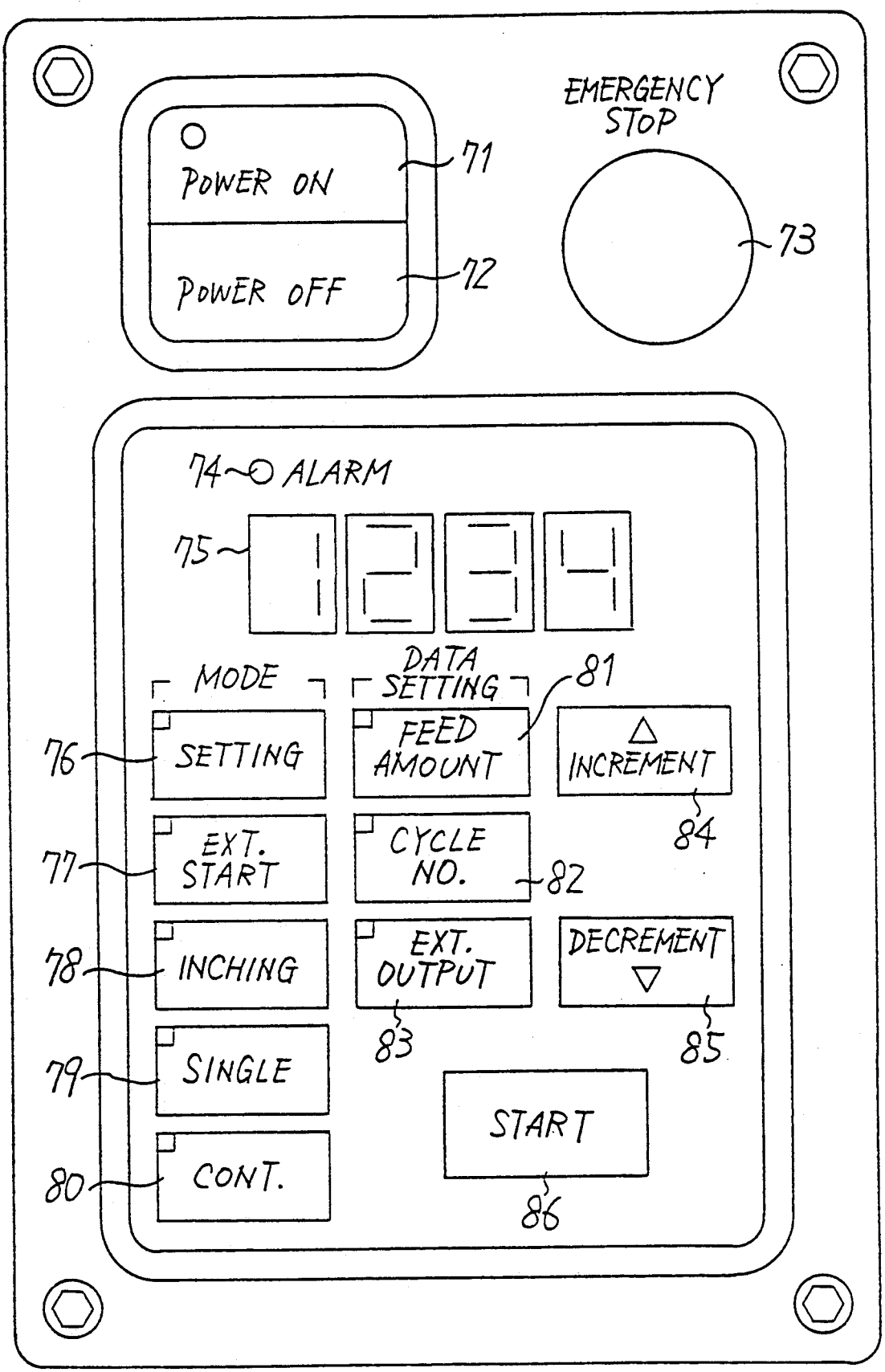
FIG. 6 is a front elevational view of an operator's control panel provided on the machine.

The operator's control panel 15 has various operator's control switches and indicator lights, as shown in the front elevational view of FIG. 6, which includes: POWER ON and POWER OFF switches 71, 72 with indicator lights, for turning on and off the tapping machine (control board 16); an EMERGENCY STOP switch 73 for stopping a tapping operation and returning the spindle 10 to the home position while rotating it in the reverse direction; an ALARM indicator 74 disposed below the POWER OFF switch 72; four-digit seven-segment DATA display 75 for digitally indicating various sorts of information such as the operating stroke of the spindle 10; MODE selector keys 76-80 with indicator lights; DATA SETTING keys 81-85, the keys 81-83 having respective indicator lights; and a START key 86 for starting an operation of the machine in the mode selected by the selector keys 76-80, according to the data entered through the DATA setting keys 81-85.

The MODE selector keys 76-80 are used to select an operating mode of the machine. The keys 76-80 consist of: a DATA SETTING key 76 for establishing DATA SETTING mode in which data may be entered; an EXTERNAL START key 77 for establishing an EXTERNAL START mode in which the machine is started when a start command is received from a foot-operated start switch or an external device; an INCHING key 78 for establishing an INCHING mode in which the spindle quill 27 is moved with the motor 6 operated as long as or each time the START key 86 is operated, this mode being used for set-up operation; a SINGLE CYCLE key 79 for establishing a SINGLE CYCLE mode in which one tapping cycle is performed each time the START key 86 is operated; and a CONTINUOUS CYCLING key 80 for establishing a CONTINUOUS CYCLING mode in which a tapping cycle is automatically repeated by one operation of the START key 86. These MODE selector keys 76-80 will be described in detail.

The DATA SETTING keys 81-85 consist of: a FEED AMOUNT key 81 for displaying on the display 75 a preset operating stroke X of the spindle quill 27; a CYCLE NUMBER key 82 for setting a desired number of tapping cycles to be performed in the CONTINUOUS CYCLING mode; an EXTERNAL OUTPUT key 83; an INCREMENT key 84 for incrementing the digital value displayed on the display 75; and a DECREMENT key 85 for decrementing the displayed digital value. These DATA SETTING keys 81-85 will also be described in detail.

Referring next to the block diagram of FIG. 7, the control apparatus used for the present tapping machine includes triode AC semiconductor switches 91-95 in the form of so-called "triacs", for controlling the bidirectional 4/8-pole pole-change induction motor 6, that is, operating the motor 6 in the forward or reverse direction and effecting a pole changing control of the motor 6. The triacs 91, 92 are used for establishing the 4-pole mode while the triac 93 is used for establishing the 8-pole mode. The triacs 94 and 95 are used for establishing the forward and reverse operating directions of the motor 6, respectively.

The triacs 91-95 are connected through respective drivers 96-99 to the microcomputer 100, which has a backup memory 101 for reserving stored data even while power is removed from the machine.

The various components 71-86 provided on the operator's control panel 15 are also connected to the microcomputer 100, so that signals from the switches and keys 71-73 and 76-86 are applied to the microcomputer 100 and so that the indicator lights 71, 72, alarm indicator 74, indicator lights 76-83, and DATA display 75 are driven. The photoelectric detector 65 of the rotary encoder 60 is also connected to the microcomputer 100, so that the A-phase and B-phase signals and the home-position signal from the sensors 65A-65C are received by the microcomputer 100. The A-phase and B-phase signals are also applied to a phase difference detecting circuit 102, so that the circuit 102 applies to the microcomputer 100 a direction signal indicative of the direction of operation of the motor 6, or the direction of movement of the spindle quill 27 (spindle 10). A pulse counter 103 is provided to count the number of pulses of the A-phase signal, in the incrementing or decrementing direction depending upon the operating direction of the motor 6. The count of the pulse counter 103 is changed upon rising of each A-phase signal pulse, and the signal representative of the count is applied to the microcomputer 100.

The microcomputer 100 receives an EXTERNAL START signal 105 from the foot-operated switch or external device in the EXTERNAL START mode described above, an EXTERNAL EMERGENCY STOP signal 106 from the external device, and an EXTERNAL HOME-POSITION signal 107 from a limit switch provided on the machine. The EXTERNAL HOME-POSITION signal 107 represents a RETRACT position of the spindle 10 (quill 27) which is different from the original home position detected by the home-position sensor 65C. The microcomputer 100 is connected to signal output circuits 108-111 which generate an EXTERNAL MODE signal 112, a HOME-POSITION signal 113, an EXTERNAL OUTPUT signal 114, and an ALARM signal 115. These signals from the output circuits 108-111 are used to control an indexing table provided on the tapping machine, or other tapping machines.

A cover switch 120 is disposed near the cover 51 covering the change gears 41, 42, so that the switch 120 is closed when the cover 51 is placed in position after the appropriate change gears 41, 42 have been installed. A signal from this cover switch 120 is applied to the microcomputer 100, to inhibit the spindle motor 6 from being energized for safety purpose, when the cover 51 is not installed.

The microcomputer 100 also receives a signal from a thermal switch 121 provided for the spindle motor 6, for detecting the overheating of the motor 6. The control apparatus uses DC power circuits 122-124 for supplying power to the drivers 96-99.

The microcomputer 100 determines the position of the spindle quill 27 (spindle 10), according to the A-phase and B-phase signals from the sensors 65A, 65B of the photoelectric detector 65 of the rotary encoder 60 and the count of the pulse counter 103, and applies the drive signals to the drivers 96-99 according to the data entered through the operator's control panel 15, to control the spindle motor 6 in the selected mode.

There will be described a tapping operation of the machine under the control of the microcomputer 100 of the control apparatus described above.

FIG. 8(a) shows a basic or standard reciprocating action of the spindle quill 27 over the predetermined operating stroke X. In this basic reciprocating action, the spindle quill 27 is advanced from the home position of the machine detected by the home-position sensor 65C of the encoder 60, to the lower end of the stroke X, while the spindle motor 6 is operated in the forward direction. When the lower end of the stroke X which corresponds to the bottoming point of the tapping tool is reached, the operating direction of the motor 6 is reversed to return the quill 27 back to the home position. The operating stroke X is preset by entering appropriate data through the operator's control panel 15.

Figure 8E:
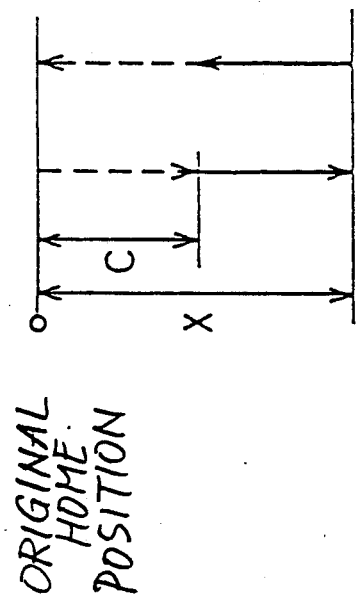

FIGS. 8(b) through 8(f) show special tapping operations. FIG. 8(b) shows a tapping operation wherein the quill 27 is retracted to a RETRACT position designated by the EXTERNAL HOME-POSITION signal 107, after the lower end of the stroke X is reached in each tapping cycle. When the EMERGENCY STOP switch 73 is operated, the quill 27 is returned to the home position of the machine. The EXTERNAL HOME-POSITION signal 107 is applied to the microcomputer 100 while the quill 27 is located between the machine home position and the RETRACT position. In this tapping operation, the motor 6 is reversed when the signal 107 is received, by applying a forward drive signal to the motor 6 for a predetermined time. This time can be set through the panel 15, in increments of 10 milliseconds.

FIG. 8(c) shows a "peck" tapping operation wherein the tapping movement of the quill 27 over predetermined operating stroke X is obtained by two or more advancing motions of the quill 27, so that the cutting chips may be easily removed. In this case, the distance A of each advancing motion of the quill 27 is entered through the panel 15, in increments of 1 mm.

FIG. 8(d) shows a tapping operation in which the quill 27 is moved at a rapid traverse rate over a distance B from the home position to a tapping start position, from which the quill 27 is fed for tapping with the motor 6 rotated in the forward direction. When the lower end of the stroke X is reached, the quill 27 is returned at the rapid traverse rate back to the home position. The rapid traverse rate which is established by the 8-pole connection of the motor 6 is two times the tapping feed rate established by the 4-pole connection of the motor. The rapid traverse distance B is entered through the panel 15, in increments of 1 mm.

FIG. 8(e) shows a tapping operation in which the quill 27 is moved at the rapid traverse rate over a distance C from the home position to the tapping start point. The advancing tapping motion from the tapping start point and the retracting motion from the bottoming point back to the tapping start point are both effected at the feed rate. When the tapping start point is reached during a return movement to the home position, the feed rate is switched to the rapid traverse rate, so that the quill 27 is rapid-traversed to the home position over the distance C. This tapping operation is different from the operation of FIG. 8(d) in that the quill 27 is retracted at the tapping feed rate from the lower end of the stroke X to the tapping start point. The distance C is set through the panel 15, in increments of 1 mm.

Figure 8F:
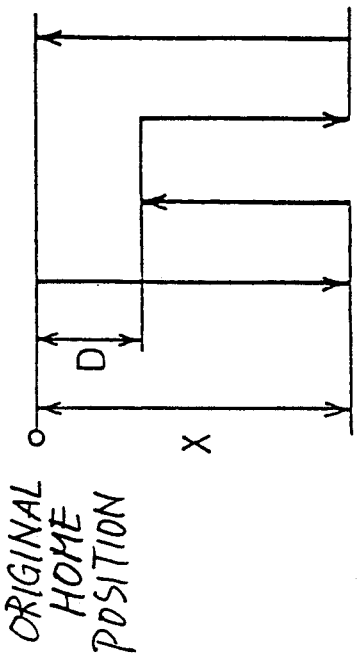

FIG. 8(f) shows a two-pass tapping operation in which the quill 27 is reciprocated two times over the tapping length of the operating stroke X. This two-pass tapping is performed where an internal thread is cut in a workpiece made of a resin or other material which contracts after a tapping operation. A distance D from the home position to the tapping start position is set through the panel 15, in increments of 1 mm.

In the event of activation of the overload protective spindle or feed clutch 11, 12 during a tapping operation due to sticking tendency of the tap or inadequate cutting of a hole to be tapped, the spindle motor 6 is automatically turned off to stop the feeding movement of the quill 27, and the ALARM indicator 74 is turned on. The activation of the clutch 11, 12 is detected by the microcomputer 100, based on the A-phase signal generated by the A-phase sensor 65A of the encoder 60, more precisely, based on the pulse interval determined by the pulses of the A-phase signal. Specifically, the microcomputer 100 detects an overload applied to the clutch 11, 12 when the microcomputer 100 has not received a pulse of the A-phase signal for a period two times that of the last pulse interval. In this event, the DATA display 75 provides a code "A115" indicative of the feeding trouble of the quill 27, while the ALARM indicator 74 is illuminated.

In the above case, the spindle quill 27 may be stopped at a position within the tapping length, or retracted to the home position, depending upon the appropriate parameter setting through the panel 15.

One of the tapping operations as illustrated in FIGS. 8(a) through 8(f) is performed in the SINGLE CYCLE mode selected by the SINGLE CYCLE key 79, or in the CONTINUOUS CYCLING mode selected by the CONTINUOUS CYCLING key 80.

Figure 9A:
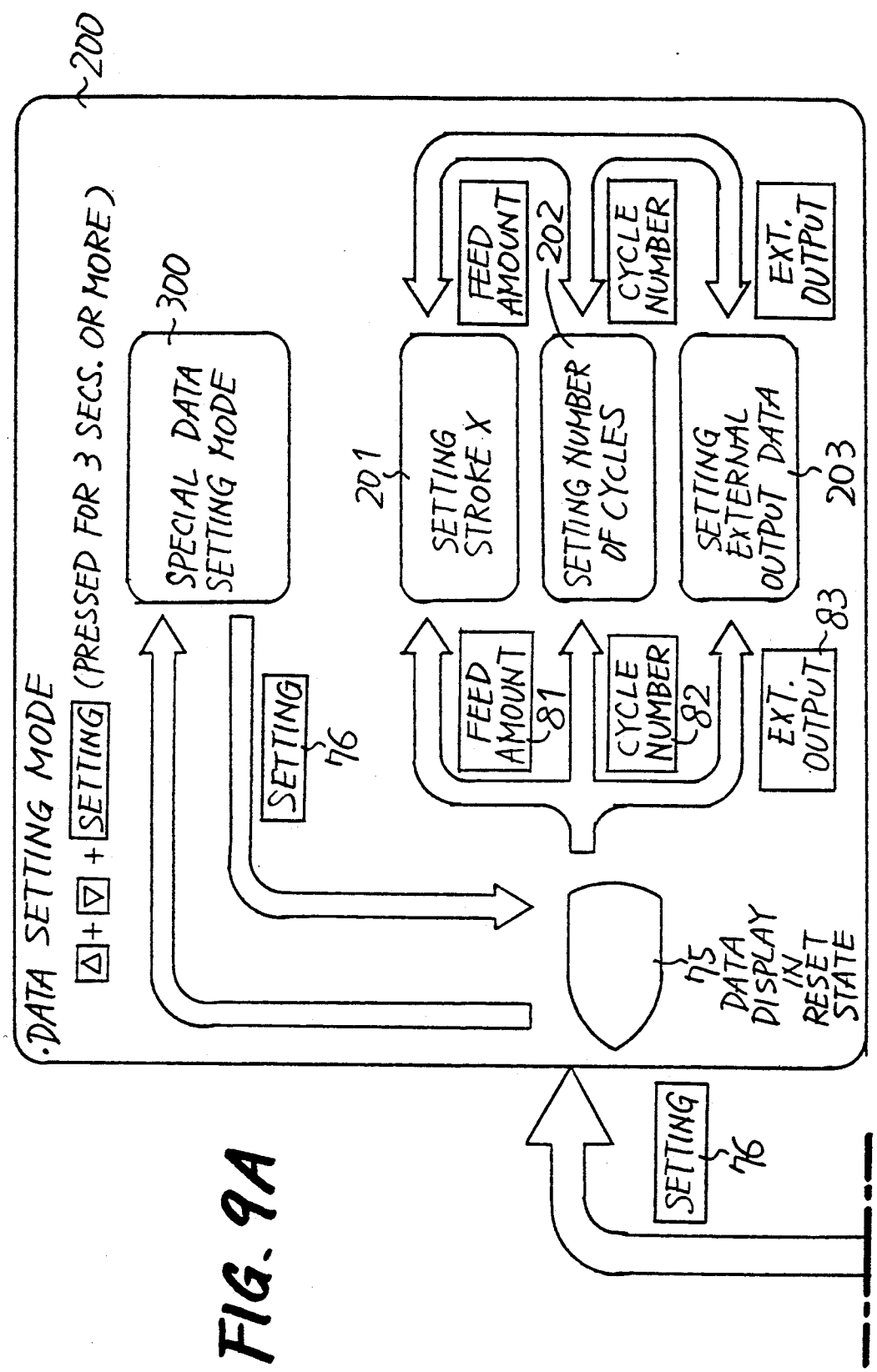
Figure 9B:
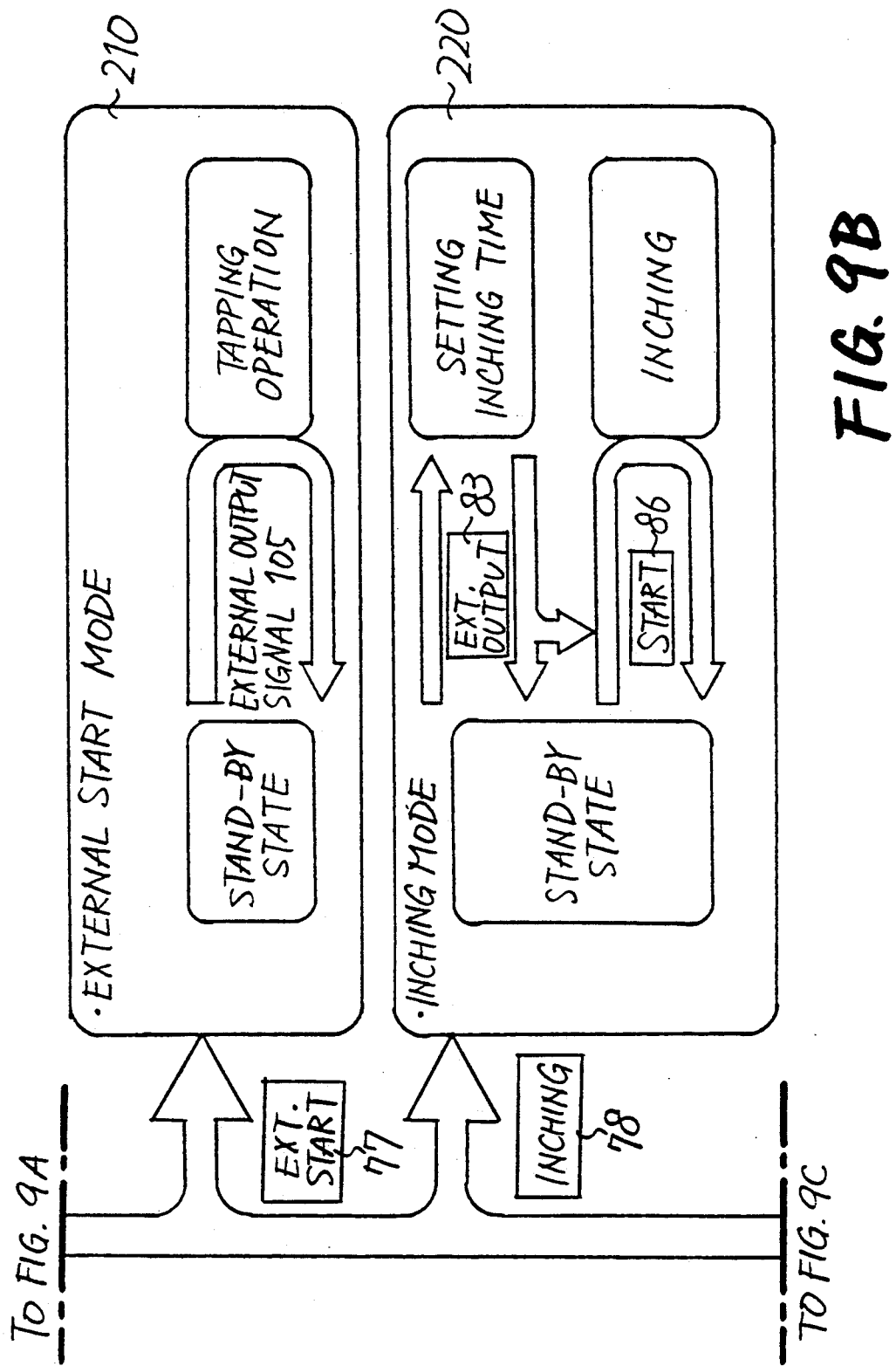
Figure 9C:
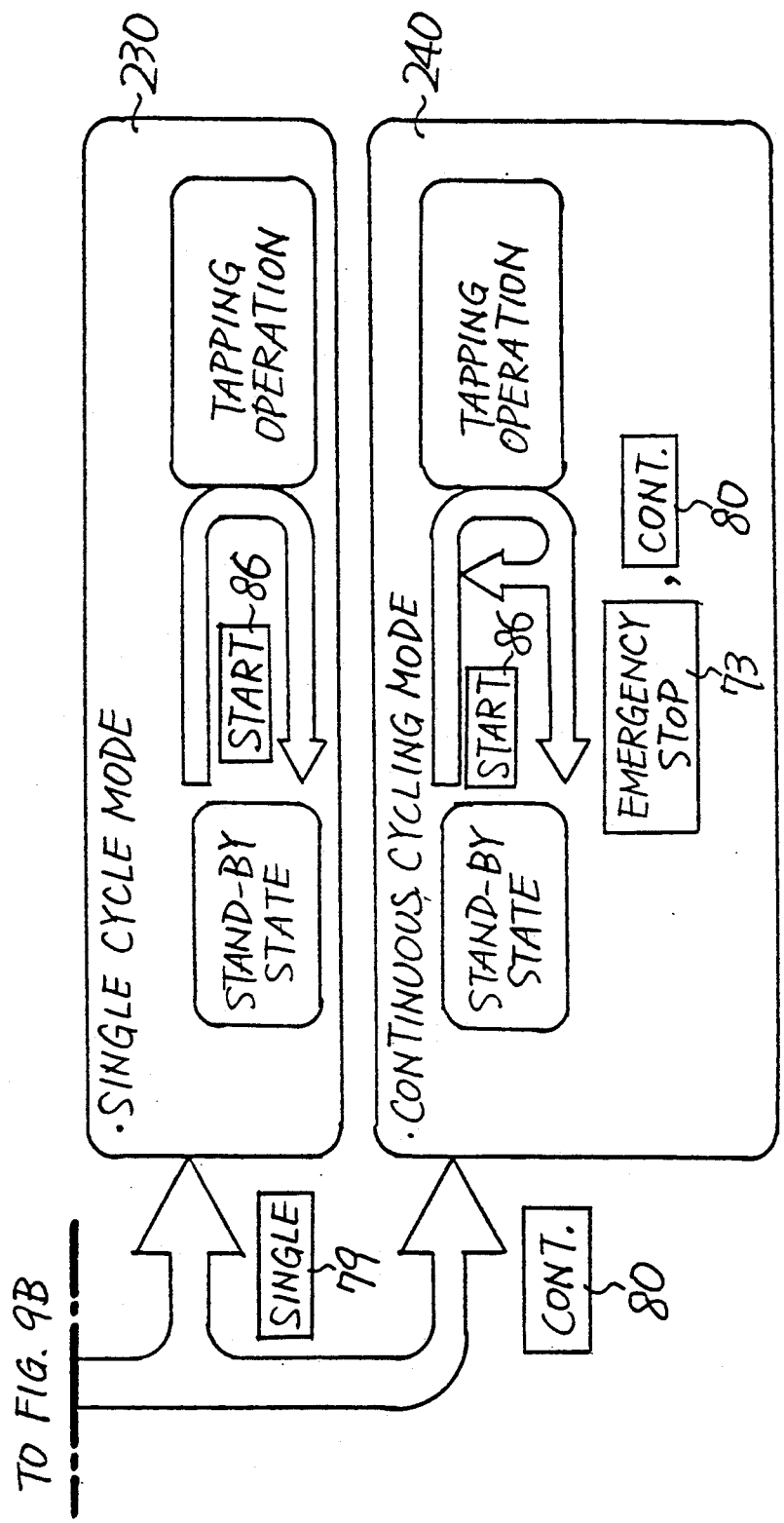

Referring next to FIG. 9, there will be described the five different modes of operation selected by the MODE selector keys 76-80 provided on the operator's control panel 15.

When the DATA SETTING key 76 is pressed, the microcomputer 100 is placed in the DATA SETTING mode indicated at 200 in FIG. 9, in which various sorts of data or information may be entered. When the EXTERNAL START key 77 is pressed, the EXTERNAL START mode is established as indicated at 210, to initiate a tapping operation when the EXTERNAL START signal 105 is received from the foot-operated switch provided for the machine or external device. When the INCHING key 78 is pressed, the INCHING mode is established as indicated at 220. In the INCHING mode, the spindle motor 6 is inched, i.e., operated in the forward direction for a predetermined time to advance the quill 27 by a corresponding distance, each time the START key 86 is pressed. The inching operation is utilized for facilitating the change of the change gears 41, 42, and a centering alignment between the tap and the hole to be tapped. The SINGLE CYCLE mode indicated at 230 in FIG. 9 is established by pressing the SINGLE CYCLE key 79. In this mode, only one tapping cycle is performed each time the START key 86 is operated. The CONTINUOUS CYCLING mode indicated at 240 is selected by pressing the CONTINUOUS CYCLING key 80. In this mode, a tapping cycle is continuously repeated according to the data entered through the panel 15, by pressing the START key 86. When each of these five MODE selector keys 76-80 is pressed, the microcomputer 100 is placed in the standby state ready to start the selected mode of operation. When the DATA SETTING key 76 is pressed, for example, the DATA display 75 is in the reset state displaying no data.

In the INCHING MODE 220, the inching time indicated above may be changed. Specifically, by pressing the EXTERNAL OUTPUT key 83, the DATA display 75 indicates the presently effective inching time, i.e., the time for operating the spindle motor 6 in the forward direction in the INCHING mode 220. When the INCREMENT or DECREMENT key 84, 85 is pressed in this condition, the inching time displayed on the display 75 is changed in increments of 0.1 second. The inching time may be selected within a range from 0.1 second up to five seconds.

In the DATA SETTING mode 200, the operating stroke X of the quill 17, the number of tapping cycles, and external output data may be specified or entered, as three data setting operations as indicated at 201, 202 and 203 in FIG. 9. If the FEED AMOUNT key 81 is pressed in the DATA SETTING mode 200, for example, the currently effective operating stroke X is displayed on the DATA display 75. When the INCREMENT or DECREMENT key 84, 85 is pressed in this condition, the displayed operating stroke X is changed in increments of a predetermined unit. When the key 84, 85 is held pressed, the speed at which the stroke X is changed is automatically changed in three steps, depending upon the time during which the key is held pressed.

When the CYCLE NUMBER key 82 is pressed in the DATA SETTING mode 200, the currently effective number of the tapping cycles to be continuously performed is displayed on the display 75. The displayed number may be reset or changed to a desired value by operating the INCREMENT or DECREMENT key 84, 85. When the EXTERNAL OUTPUT key 83 is pressed in the same mode 200, the display 75 displays the stored digital external output data representative of the position of the quill 27 at which the EXTERNAL OUTPUT signal 114 is fed to an external device such as an indexing table. The external output data may be changed by the keys 84, 85.

Figure 10:
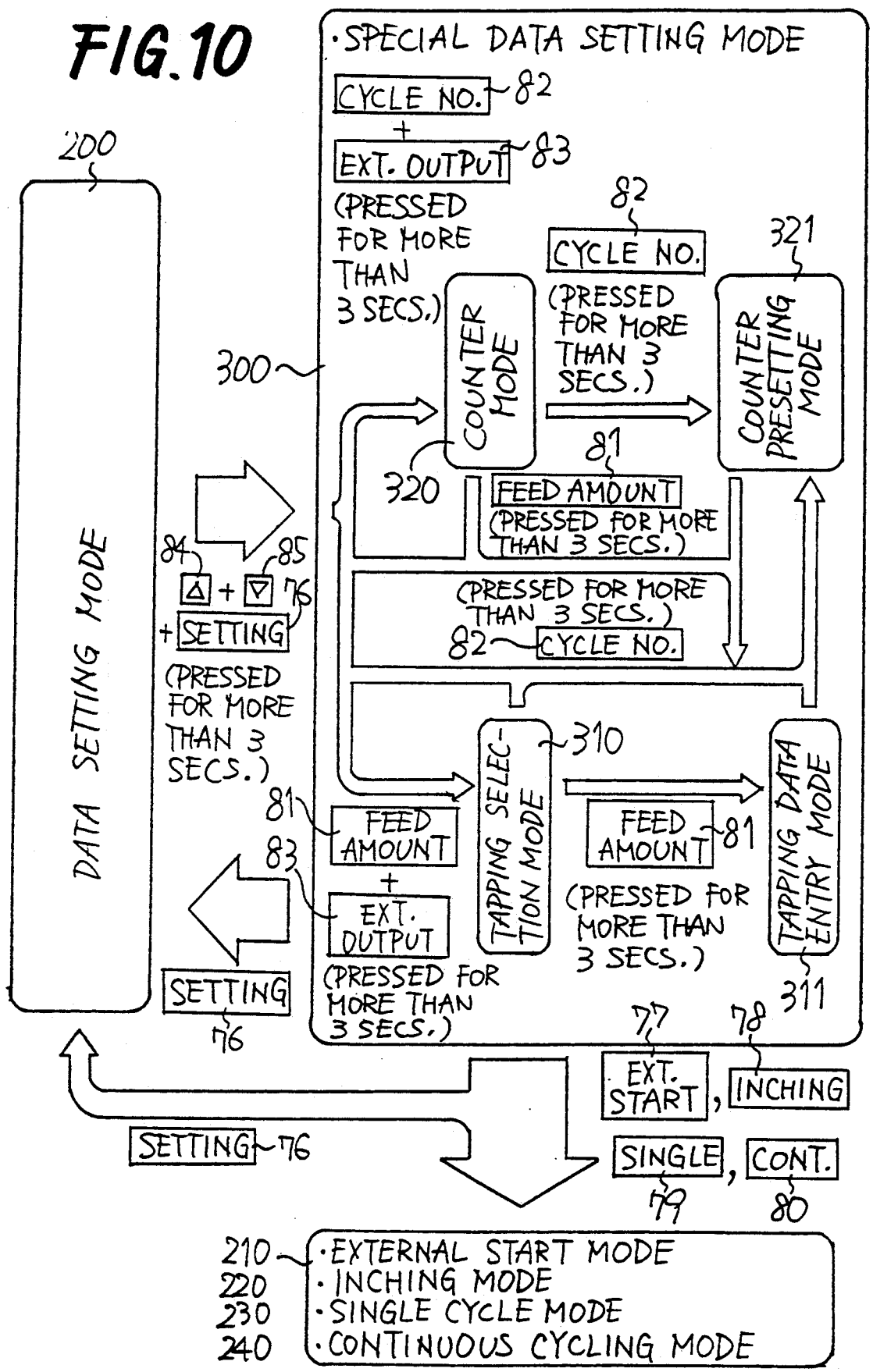

In the DATA SETTING mode 200, a SPECIAL DATA SETTING mode as indicated at 300 may be established by concurrently pressing the three keys, i.e., DATA SETTING key 76, and INCREMENT and DECREMENT keys 84, 85, for three seconds or more. FIG. 10 shows the SPECIAL DATA SETTING mode 300. If one of the MODE selector keys 76-80 is pressed in the SPECIAL DATA SETTING mode 300, the microcomputer 100 is returned to the corresponding one of the five modes 200, 210, 220, 230 and 240.

In the SPECIAL DATA SETTING mode 300, one of the special tapping operations illustrated in FIGS. 8(b) through 8(f) may be selected, and the various kinds of data for the special tapping operations and the number of tapping cycles may be entered. Further, the data for an automatic return movement of the quill 27 in the event of an emergency may be entered in this SPECIAL DATA SETTING mode 300.

One of the basic and special tapping operations may be selected in a TAPPING SELECTION mode 310, which is established by concurrently pressing the FEED AMOUNT key 81 and EXTERNAL OUTPUT key 83 for three seconds or more in the SPECIAL DATA SETTING mode 300. Each time the two keys 81, 83 are subsequently pressed concurrently for one second or more, the first digit of a displayed tapping mode code indicative of one of the six tapping operations is changed by one in a cyclic manner, as "0-F0", "0-F1", "0-F2", "0-F3", "0-F4" and "0-F5". The numerals "0" through "5" at the first digit of the tapping mode code respectively represent the basic and special tapping operation of FIGS. 8(a), 8(b), 8(c), 8(d), 8(e) and 8(f), respectively. Normally, the first digit is set at "0" for the basic tapping operation.

After the tapping operation is selected in the TAPPING SELECTION mode 310, the FEED AMOUNT key 81 is held pressed for three seconds or more, to establish a TAPPING DATA ENTRY mode 311, in which the currently effective distances A, B, C and D of FIGS. 8(c)-8(f) and other data are selectively displayed on the display 75. In this condition, the INCREMENT or DECREMENT key 84, 85 is operated to change the displayed data as desired.

If one of the five MODE selector keys 76-80 is operated after the data are entered in the TAPPING DATA ENTRY mode 311, the microcomputer 100 is restored to the corresponding mode 200, 210, 220, 230 and 240. By operating the START key 86 in the EXTERNAL START, SINGLE CYCLE or CONTINUOUS CYCLING mode, the selected tapping operation is performed.

If the CYCLE NUMBER key 82 and EXTERNAL OUTPUT key 83 are concurrently operated for three seconds or more in the SPECIAL DATA SETTING mode 300, a COUNTER mode 320 is established. Each time the CYCLE NUMBER key 82 and EXTERNAL OUTPUT key 83 are subsequently pressed concurrently for one second or more in this mode 320, the fourth digit of a counter mode code displayed on the display 75 is changed in a cyclic manner, as "U-F0", "D-F0", "0-F0". The alphabet "U" at the first digit of the counter mode code represents an up-counting or incremental counting mode of a CYCLE NUMBER counter 100a which is incorporated in the microcomputer 100, to count the number of the tapping cycles which have been completed. The alphabet "D" of the code represents a down-counting or decremental counting mode of the counter 100a. The numeral "0" at the first digit of the code represents the reset state of the counter 100a.

After the operation in the COUNTER mode 320 is completed, the CYCLE NUMBER key 82 is held pressed for three seconds or more, to establish a COUNTER PRESETTING mode 321. In this mode, the desired number of tapping cycles is set by using the INCREMENT or DECREMENT key 84, 85. When the up-counting mode is currently selected, three decimal points are displayed at the second, third and fourth digits of the display 75, as ". . . -". If the down-counting mode is selected, two decimal points are displayed at the second and third digits of the display 75, as "- . . -".

Thus, the operator may know the currently selected mode of the CYCLE NUMBER counter 100a.

After the CYCLE NUMBER counter 100a is preset in the mode 321, one of the five MODE selector keys 76-80 is pressed to establish the corresponding mode. If the START key 86 is operated in the EXTERNAL START, SINGLE CYCLE or CONTINUOUS CYCLING mode 210, 230 or 240, the relevant tapping operation is performed until the CYCLE NUMBER counter 100a has counted the preset number. During this tapping operation, the DATA display 75 displays the number of the completed tapping cycles which have been performed, if the counter 100a is placed in the up-counting mode, or the number of the remaining tapping cycles which will be performed, if the counter 100a is placed in the down-counting mode. Namely, the tapping operation is ended when the displayed number reaches the preset number in the up-counting mode, or when the displayed number becomes "0" in the down-counting mode.

If the EXTERNAL OUTPUT key 83 is held pressed for three seconds or more in the SPECIAL DATA SETTING mode, the microcomputer 100 is placed in an EMERGENCY RETURN SETTING mode in which one of automatic emergency return modes of the spindle quill 27 can be selected. Each time the key 83 is subsequently held pressed for three seconds or more, the second digit of a return mode code displayed on the display 75 is changed in a cyclic manner, as "0-F0", "0JF0" and "0HF0". The symbol "-" of the return mode code represents the automatic emergency return mode in which the spindle quill 27 is stopped immediately after the detection of an emergency, with the ALARM indicator 74 turned on. The alphabet "J" of the code represents the automatic emergency return mode in which the quill 27 is automatically returned to the home position and then stopped, with the ALARM indicator 74 turned on, in the event of activation of the spindle or feed clutch 11, 12. The alphabet "H" of the code represents the automatic emergency return mode in which the quill 27 is returned to the home position but not stopped, without the ALARM indicator 74 turned on, in the event of activation of the clutch 11, 12. In this emergency return mode, the tapping operation is continued after the quill 27 is returned to the home position. If one of the MODE selector keys 76-80 is operated in the EMERGENCY RETURN SETTING mode, the microcomputer 100 is restored to the corresponding mode 200, 210, 220, 230, 240.

The microcomputer 100 used in the control apparatus of the present tapping machine has a self-diagnostic function. Namely, in the event of occurrence of any abnormality or operating error, the ALARM indicator 74 is illuminated, and the DATA display 75 provides an alpha-numeric error code which informs the operator of the cause for the abnormality or the error.

If, for example, the EMERGENCY STOP switch 73 remains on upon application of power to the machine, the display 75 provides an error code "A014". If an abnormality is found during automatic diagnosis of the backup memory 101, an error code "EEEE" is provided on the display 75. If the signal from the cover switch 120 is not present due to removal of the cover 51 for the change gears 41, 42, an error code "A112" is provided. If the encoder 60 fails to generate the A-phase, B-phase and home-position signals during a tapping operation, the display 75 provides an error code "A011". An error code "A115" is provided if the spindle or feed clutch 11, 12 is activated during a feeding movement of the quill 27. If the clutch 11, 12 is activated due to sticking of the tap during a retracting movement of the quill 27, an error code "A017" is displayed. If the thermal switch 121 is activated due to overheating of the motor 6, the display 75 provides an error code "A113". The display 75 provides an error code "A209" if the CYCLE NUMBER counter 100a is erroneously preset in the COUNTER PRESETTING MODE 321.

Thus, the relatively small-capacity four-digit DATA display 75 which normally indicates the number of the completed or remaining tapping cycles is adapted to display an error code indicative of an abnormality or an error in the event of occurrence of the abnormality or error. This arrangement does not require a large-capacity display for the diagnostic purpose.

The various operations of the microcomputer 100 which have been described above by reference to FIGS. 9 and 10 will be described referring to the flow charts of FIGS. 11-16.

Figure 11:
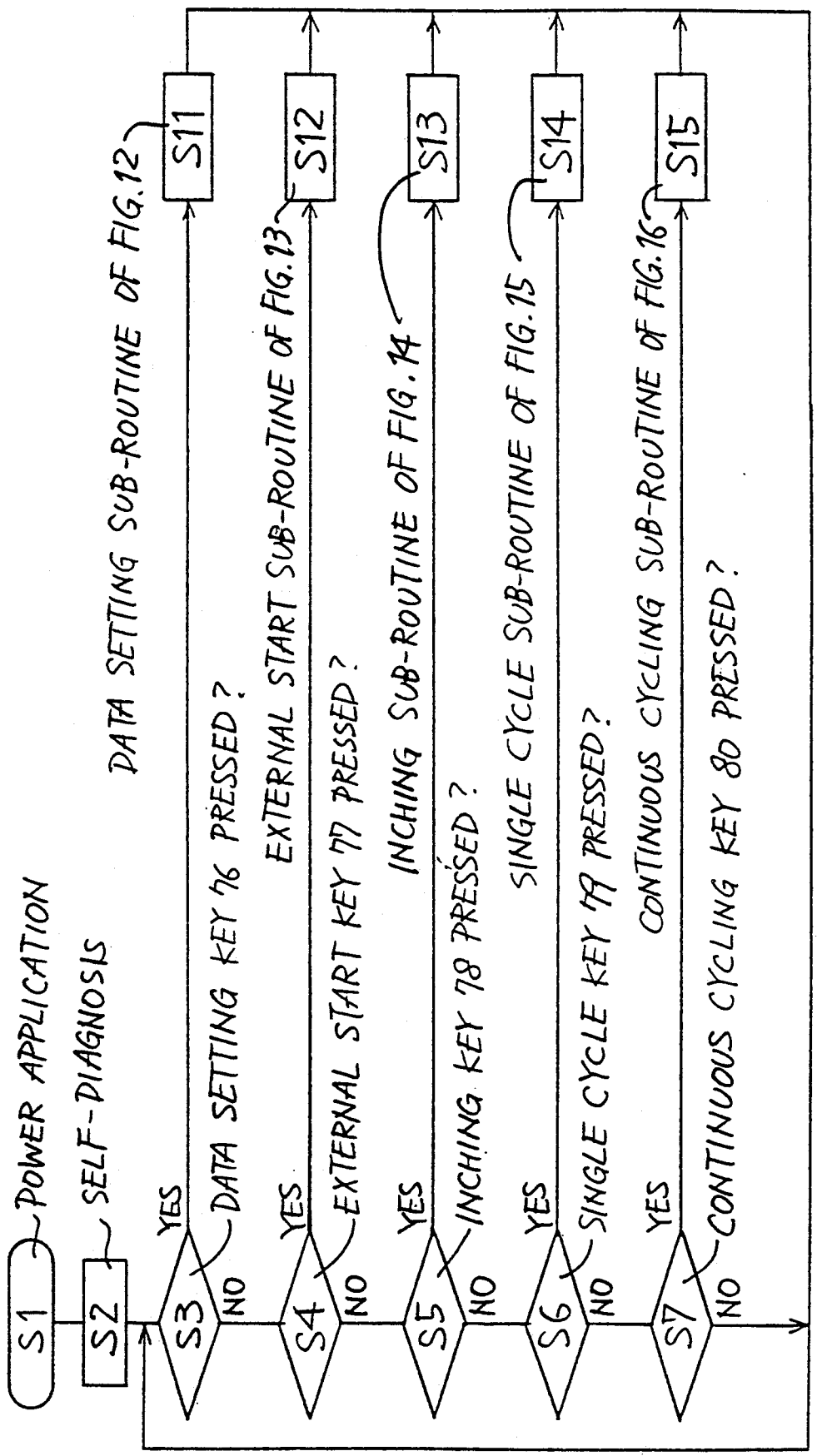
FIGS. 11-16 are flow charts illustrating a machine control operation of a microcomputer of the control apparatus of FIG. 7.

Referring to the flow chart of FIG. 11, there is illustrated a main control routine of the microcomputer 100. After the application of power to the machine in step S1, the control flow goes to step S2 to perform a self-diagnosis of the machine. The self-diagnosis includes the following checking items: whether the EMERGENCY STOP switch 73 or any other key does not remain on; whether the EXTERNAL START signal 105 does not remain present; whether the signal from the cover switch 120 is present; whether the home-position signal of the encoder 60 is present; whether the data stored in the various memories are normal. During this self-diagnostic operation, the indicator lights and the DATA display 75 on the operator's control panel 15 flicker.

Then, the control flow goes to steps S2-S7 to determine whether any one of the MODE selector keys 76-80 is pressed, or not. If the DATA SETTING key 76 is pressed, step S3 is followed by step S11 to execute a data setting sub-routine of FIG. 12, with the microcomputer 100 placed in the DATA SETTING mode 200. If the EXTERNAL START key 77 is pressed, step S4 is followed by step S12 to execute an external start sub-routine, with the microcomputer 100 placed in the EXTERNAL START mode 210. If the INCHING key 78 is operated, step S5 is followed by step S13 to execute an inching sub-routine, with the microcomputer 100 placed in the INCHING mode 220. If the SINGLE CYCLE key 79 is operated, step S6 is followed by step S14 to execute a single cycle sub-routine, with the microcomputer 100 placed in the SINGLE CYCLE mode 230. If the CONTINUOUS CYCLING key 80 is operated, step S7 is followed by step S15 to execute a continuous cycling sub-routine, with the microcomputer 100 placed in the CONTINUOUS CYCLING mode 240.

When the control flow goes to the data setting sub-routine of step S11 of the main routine, the microcomputer 100 is placed in the DATA SETTING mode 200, and the indicator light of the DATA SETTING key 76 is illuminated. In the data-setting sub-routine S11, steps S21, S22 and S23 are initially executed to determine whether the FEED AMOUNT key 81, CYCLE NUMBER key 82 or EXTERNAL OUTPUT key 83 is pressed. If the key 81 is pressed, step S21 is followed by step S31 to set the operating stroke X as indicated at 201 in FIG. 9. If the key 82 is pressed, step S22 is followed by step S32 to set the number of tapping cycles as indicated at 202 in FIG. 9. If the key 83 is pressed, step S23 is followed by step S33 to set the external output data for controlling an external device or other tapping machines. If a negative decision (NO) is obtained in steps S21-23, the control flow goes to step S24 to determine whether the DATA SETTING, INCREMENT and DECREMENT keys 76, 84, 85 are concurrently held pressed for three seconds or more. If an affirmative decision (YES) is obtained in step S24, step S34 is implemented to establish the SPECIAL DATA SETTING mode 300 for executing a special data setting sub-routine of FIG. 13, to effect the special data setting operations as illustrated in FIG. 10. If a negative decision (NO) is obtained in step S24, step S25 is implemented to determine whether the DATA SETTING and EXTERNAL START keys 76, 77 are concurrently pressed. In an affirmative decision (YES) is obtained in step S25, the control flow goes to step S35 to display the signals generated by the encoder 60.

If a negative decision (NO) is obtained in all of the steps S21-S25, step S26 is implemented to determine whether one of the EXTERNAL START, INCHING, SINGLE CYCLE and CONTINUOUS CYCLING keys 77-80 is operated. If any one of the MODE selector keys 77-80 is operated, the control flow goes to step S27 to return to the main routine of FIG. 11, and the corresponding sub-routine of steps S12, S13, S14, S15 is implemented.

Figure 12:
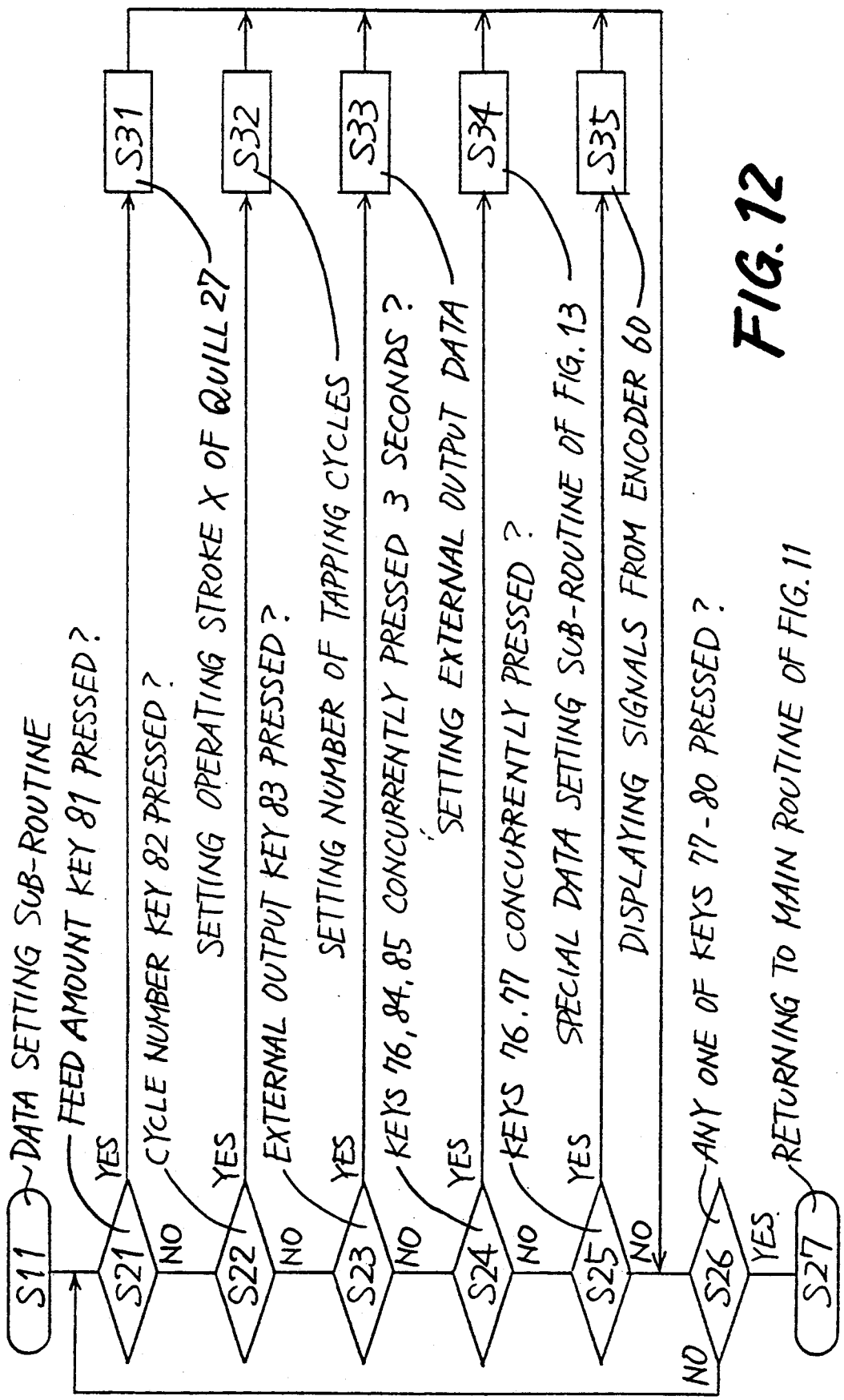
Figure 13:
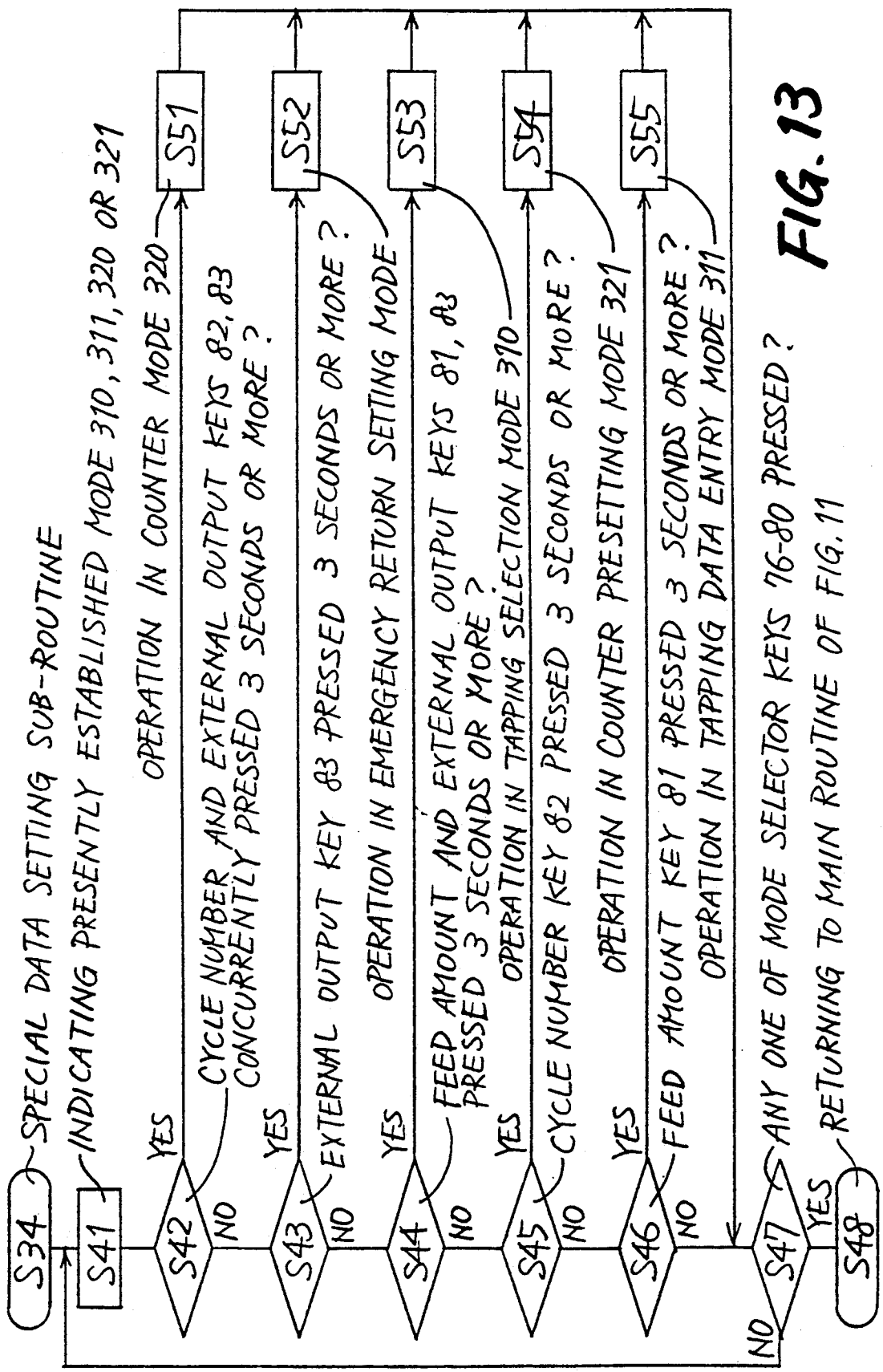

The flow chart of FIG. 13 illustrates the special data setting sub-routine of step S34 of FIG. 12 to be performed in the SPECIAL DATA SETTING mode 300 of FIG. 10. In this sub-routine, step s41 is initially implemented to indicate the presently established one of the modes 310, 311, 320, 321 of the SPECIAL DATA SETTING mode 300. If the TAPPING SELECTION mode 310 is presently established, a code "0UF0" is displayed on the DATA display 75. Step S41 is followed by steps S42-S46 to detect any special operation of the keys on the operator's control panel 15. Namely, If the CYCLE NUMBER and EXTERNAL OUTPUT keys 82, 83 are concurrently held pressed for three seconds or more, step S42 is followed by step S51 to perform an operation in the COUNTER mode 320. If the EXTERNAL OUTPUT key 83 is held pressed for three seconds or more, step S43 is followed by step S52 to perform an operation in the EMERGENCY RETURN SETTING mode (described before but not indicated in FIG. 10). If the FEED AMOUNT and EXTERNAL OUTPUT keys 81, 83 are concurrently held pressed for three seconds or more, step S44 is followed by step S53 to perform an operation in the TAPPING SELECTION mode 310. If the CYCLE NUMBER key 82 is held pressed for three seconds or more, step S45 is followed by step S54 to perform an operation in the COUNTER PRESETTING mode 321. If the FEED AMOUNT key 81 is held pressed for three seconds or more, step S46 is followed by step S55 to perform an operation in the TAPPING DATA ENTRY mode 311. If a negative decision (NO) is obtained in all of the steps S42-S46, the control flow goes to step S47 to determine whether any one of the MODE selector keys 76-80 is operated, or not. If an affirmative decision (YES) is obtained in step S47, the control flow goes to step S48 to return to the main routine of FIG. 11.

Figure 14:
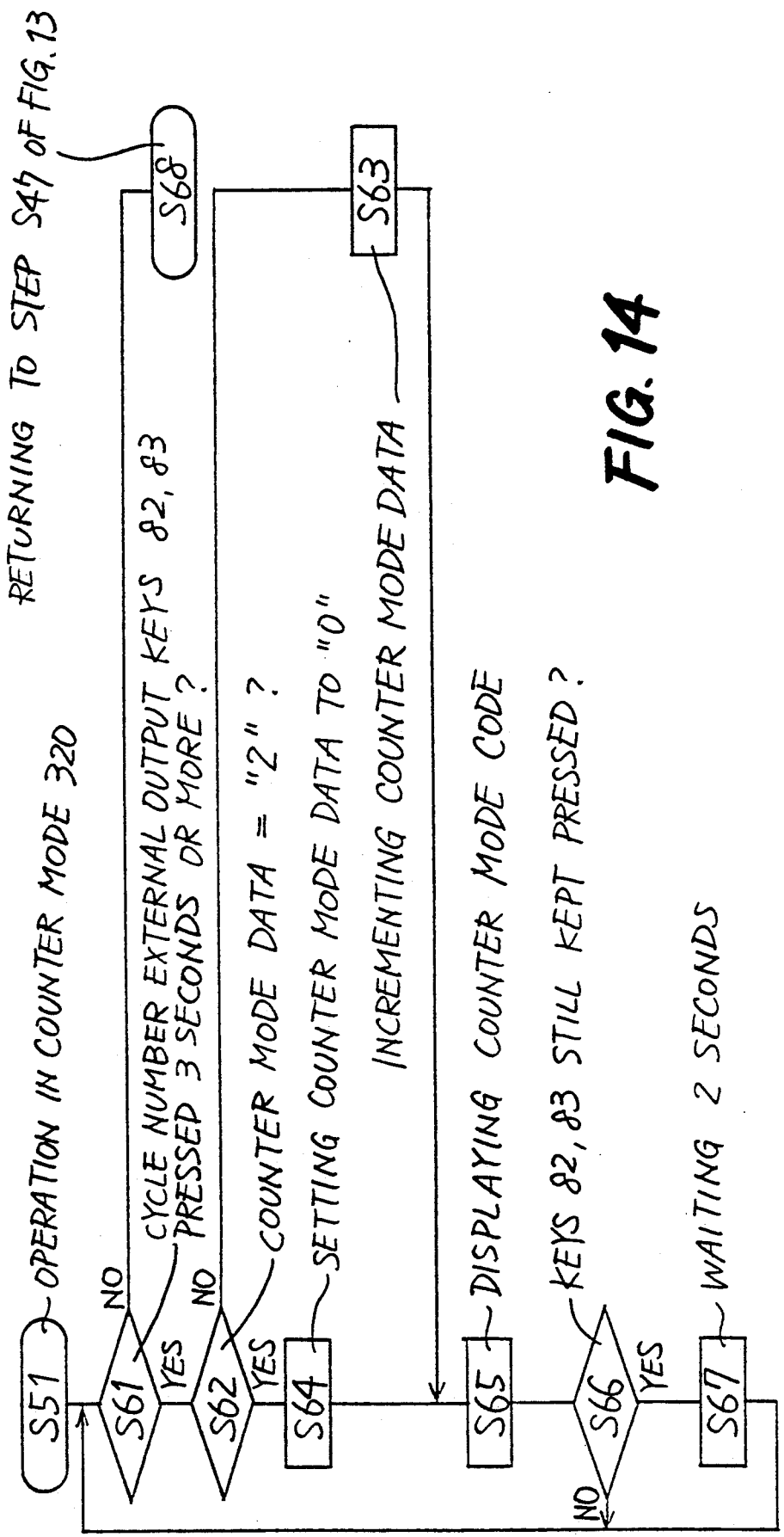

Referring to FIG. 14, there is illustrated the operation in the COUNTER mode 320. Initially, step S61 is executed to determine whether the CYCLE NUMBER and EXTERNAL OUTPUT keys 82, 83 are held pressed for three seconds or more. If a negative decision (NO) is obtained in step S61, the control flow returns to step S47 of the special data setting sub-routine of FIG. 13. If an affirmative decision (YES) is obtained in step S61, the control flow goes to step S62 to determine whether counter mode data corresponding to the first digit of the counter mode code are "2" or not. If the counter mode data are not "2", step S63 is implemented to increment the counter mode data. If the counter mode data are "2", step S64 is implemented to set the counter mode data to "0". Then, step S65 is implemented to display the appropriate counter mode code on the display 75, as described before. The counter mode data "0", "1" and "2" respectively correspond to "0", "U" and "D" of the first digit of the counter mode code to be displayed. Step S65 is followed by step S66 to determine whether the CYCLE NUMBER key 82 is still kept pressed. If an affirmative decision (YES) is obtained in step S66, step S67 is executed to allow two seconds to elapse, and the control flow goes back to step S61. If a negative decision is obtained in step S67, the control flow returns to step S61, skipping step S67.

Figure 15:
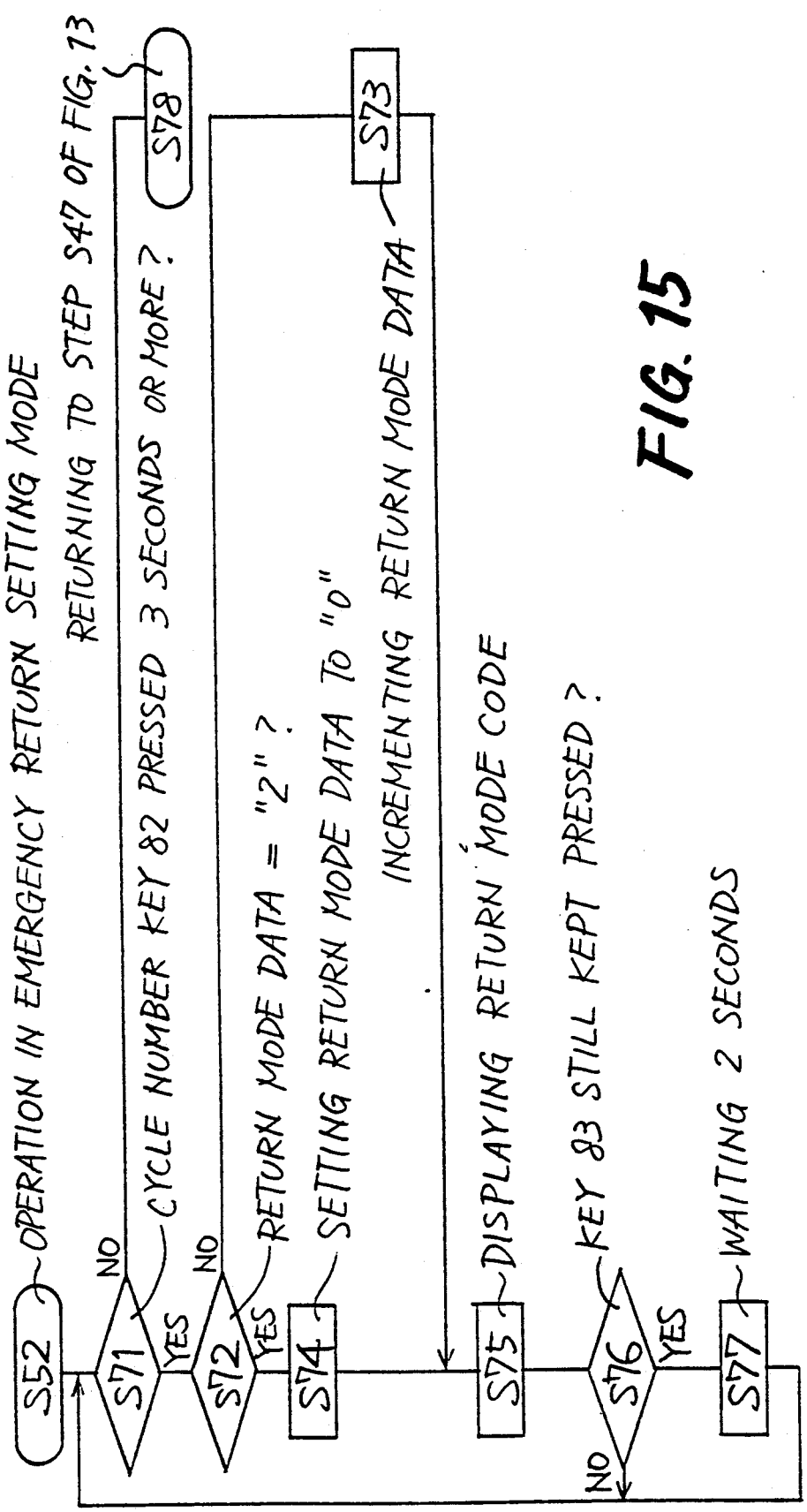

Referring to FIG. 15, there is illustrated the operation in the EMERGENCY RETURN SETTING mode. Initially, step S71 is executed to determine whether the CYCLE NUMBER key 82 is held pressed for three seconds or more. If a negative decision (NO) is obtained in step S71, the control flow returns to step S78 to return to step S47 of FIG. 13. If an affirmative decision (YES) is obtained in step S71, step S72 is implemented to determine whether emergency return mode data corresponding to the second digit of the emergency return mode code are "2", or not. If a negative decision (NO) is obtained in step S72, step S73 is implemented to increment the emergency return mode data. If an affirmative decision (YES) is obtained in step S72, step S74 is implemented to set the emergency return mode data to "0". Then, step S75 is implemented to display the appropriate emergency return mode code on the display 75, as described before. The emergency return mode data "0", "1" and "2" respectively correspond to "-", "J" and "H" of the second digit of the emergency return mode code to be displayed. As described before, the symbol "-" and alphabets "J" and "H" represent the emergency return modes in which the spindle quill 27 is merely stopped, returned to the home position and stopped, or returned to the home position to continue the next tapping cycle. Step S75 is followed by step S76 to determine whether the CYCLE NUMBER key 82 is still kept pressed, or not. If an affirmative decision (YES) is obtained in step S76, step S77 is executed to allow two seconds to elapse, and the control flow goes back to step S71. If a negative decision (NO) is obtained in step S76, step S77 is skipped.

Figure 16:
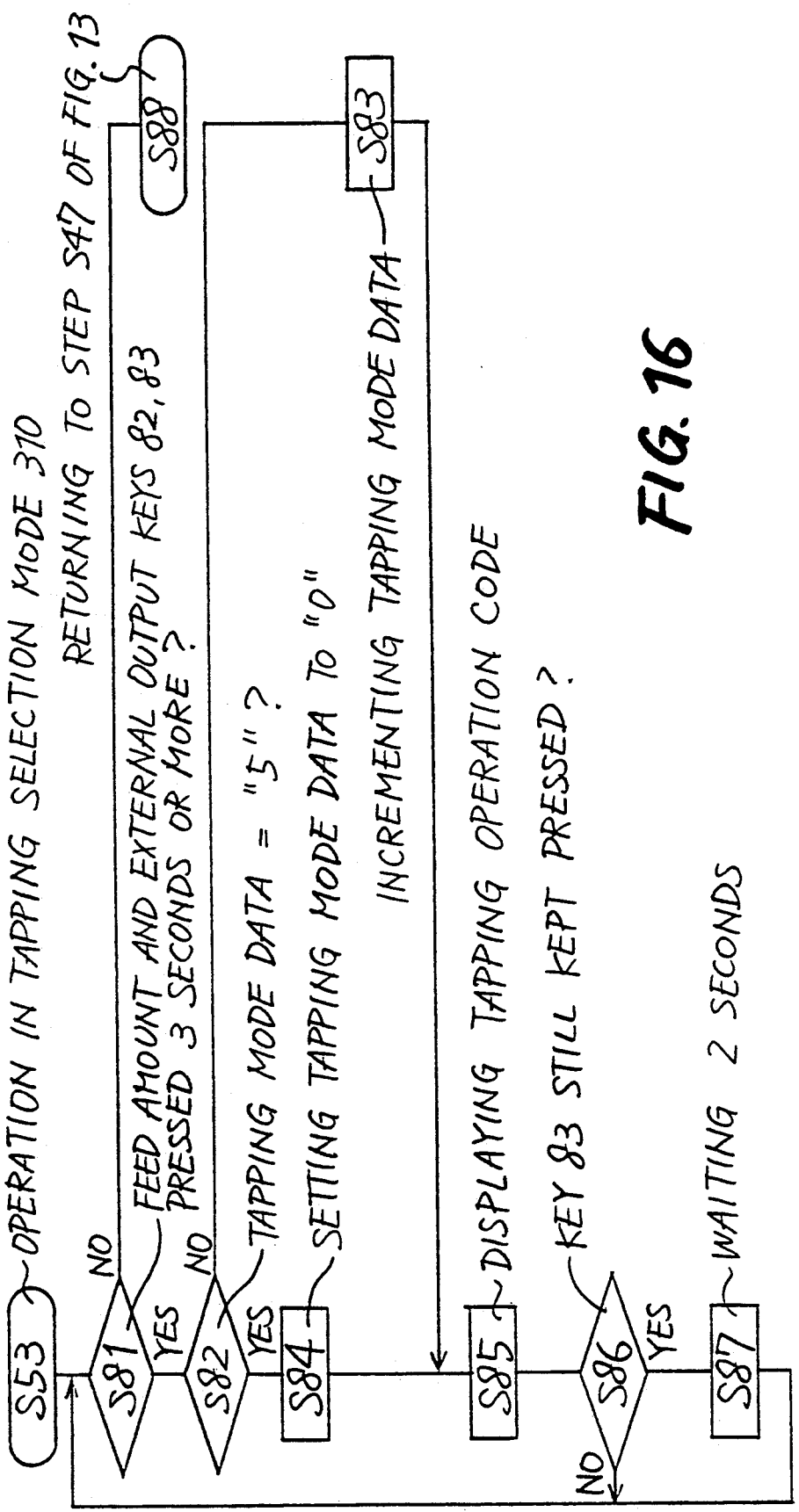

Referring next to FIG. 16, there is illustrated the operation in the TAPPING SELECTION mode 310. Initially, step S81 is executed to determine whether the FEED AMOUNT and EXTERNAL OUTPUT keys 81, 83 are held pressed for three seconds or more. If a negative decision (NO) is obtained in step S81, the control flow goes back to step S47 of FIG. 13. If an affirmative decision (YES) is obtained in step S81, step S82 is executed to determine whether tapping mode data corresponding to the first digit of the tapping mode code are "5", or not. If a negative decision (NO) is obtained in step S82, step S83 is implemented to increment the tapping mode data. If an affirmative decision (YES) is obtained in step S82, step S84 is implemented to set the tapping mode data to "0". Then, step S85 is implemented to display the appropriate tapping mode code. The tapping mode data "0" through "5" respectively correspond to the numerals "0" through "5" of the first digit of the tapping mode code to be displayed. As described before, the numeral "0" of the first digit of the code represents the basic or standard tapping operation illustrated in FIG. 8(a). Step S85 is followed by step S86 to determine whether the keys 81, 83 are still kept pressed. If a negative decision (NO) is obtained in step S86, the control flow returns to step S81. If an affirmative decision (YES) is obtained, step S87 is executed to allow two seconds to elapse, and the control flow goes back to step S81.

While the present embodiment of the control apparatus of the invention has been described, as applied to a tapping machine, the principle of the present invention is equally applicable to any other machine tools, such as a lathe or turning machine.

Although the present invention has been described in its presently preferred embodiment with a certain degree of particularity, it is to be understood that the invention is not limited to the details of the illustrated embodiment, but may be embodied with various changes, modifications and improvements, which may occur to those skilled in the art, without departing from the spirit and scope of the invention define in the following claims.

What is claimed is:

1. An apparatus for controlling a machine tool including holding means for holding a member for performing a machining operation, driving means for driving said member, an operator's control panel which has a data display with a plurality of display digits, and a plurality of operator's control switches, and a control device comprising a controller for controlling said driving means, according to control data entered through said operator's control switches, wherein said control device comprises:

special-operation detecting means for detecting one of at least one special operation of at least one of said plurality of operator's control switches;

mode selecting means responsive to said special-operation detecting means, for selecting one of at least one special operation mode of said control device which corresponds to the detected one of said at least one special operation; and special data setting control means responsive to said mode selecting means, for placing said data display in the selected one special operation mode and permitting said control device to enter special presetting data through said operator's control switches, said special presetting data being associated with said machining operation, said control device being operable to control said driving means according to said special presetting data.

2. An apparatus according to claim 1, wherein said special-operation detecting means detects one of said at least one special operation by detecting concurrent operations of a plurality of control switches of said operator's control switches.

3. An apparatus according to claim 1, wherein said special-operation detecting means detects one of said at least one special operation by detecting concurrent operations of a plurality of control switches of said operator's control switches, for at least a predetermined length of time.

4. An apparatus according to claim 3, wherein said predetermined length of time is at least three seconds.

5. An apparatus according to claim 1, wherein said special-operation detecting means detects one of said at least one special operation by detecting an operation of one of said operator's control switches for at least a predetermined length of time.

6. An apparatus according to claim 1, wherein said operator's control panel has a plurality of mode selector switches for establishing respective normal operation modes of said control device different from said at least one special operation mode, said mode selecting means changing one of said normal operation modes to said selected one special operation mode when said special-operation detecting means detects said one special operation of said at least one of said operator's control switches.

7. An apparatus according to claim 6, wherein said operator's control panel further has a plurality of data setting switches for entering said special presetting data under the control of said special data setting control means.

8. An apparatus according to claim 7, wherein said special-operation detecting means detects one of said at least one special operation by detecting concurrent operations of a plurality of control switches of said operator's control switches, said plurality of control switches concurrently operated including one of said mode selector switches.

9. An apparatus according to claim 8, wherein said plurality of control switches concurrently operated includes one of said mode selector switches which is assigned to establish a normal data setting mode in which normal setting data for said machining operation are entered through said data setting switches.

10. An apparatus according to claim 8, wherein said plurality of control switches concurrently operated includes at least one of said data setting switches.

11. An apparatus according to claim 8, wherein said plurality of control switches concurrently operated consist of two control switches of said operator's control switches.

12. An apparatus according to claim 1, wherein said special-operation detecting means detects one of a plurality of special operations of said at least one of said plurality of operator's control switches, and said mode selecting means selecting one of a plurality of special operation modes of said control device which corresponds to said one special operation.

13. An apparatus according to claim 12, wherein said plurality of special operation modes of said control device include a special data setting mode, and a plurality of special data presetting modes for entering said special presetting data, said mode selecting means establishing said special data presetting modes while said special data setting mode is established.

14. An apparatus according to claim 12, wherein said mode selecting means establishes one of said special data presetting modes when said special-operating detecting means detects a special operation of said at least one of said plurality of operator's control switches, which is different from a special operation of said at least one operator's control switch which is detected to establish said special data setting mode.

15. An apparatus according to claim 1, wherein said control device comprises memory means for storing said special presetting data entered under the control of said special data setting control means.

16. An apparatus according to claim 15, wherein said holding means consists of a spindle, and said driving means consists of a spindle motor for rotating said spindle, said spindle being reciprocably and rotatably supported by a spindle quill of the machine tool for performing a tapping operation as said machining operation, and being reciprocated and rotated by forward and reverse rotations of said spindle motor through a power transmission mechanism.

17. An apparatus according to claim 16, wherein said special presetting data include at least one of tapping mode data indicative of a plurality of different tapping operations to be performed, tapping data representative of control parameters associated with said tapping operations, cycle number data indicative of number of tapping cycles to be repeatedly performed, and counter mode data indicative of a manner of counting said number of tapping cycles.

* * * * *